(12) United States Patent
Kawamonzen et al.

(10) Patent No.: US 7,092,608 B2
(45) Date of Patent: Aug. 15, 2006

(54) POLYIMIDE OPTICAL MATERIALS, POLYIMIDE PRECURSOR SOLUTIONS AND OPTICAL WAVEGUIDE ELEMENTS

(75) Inventors: Yoshiaki Kawamonzen, Machida (JP); Toshio Nakayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/376,167

(22) Filed: Mar. 16, 2006

(65) Prior Publication Data

US 2006/0159413 A1    Jul. 20, 2006

Related U.S. Application Data

(62) Division of application No. 10/684,474, filed on Oct. 15, 2003.

(30) Foreign Application Priority Data

Oct. 31, 2002   (JP)   ............... 2002-318239

(51) Int. Cl.
   *G02B 6/00*   (2006.01)
   *G02B 6/10*   (2006.01)
(52) U.S. Cl. .................. 385/129; 385/143; 385/145
(58) Field of Classification Search ................ 385/129, 385/143, 145
   See application file for complete search history.

(56) References Cited

FOREIGN PATENT DOCUMENTS

| JP | 4-288331 | 10/1992 |
|----|----------|---------|
| JP | 4-328504 | 11/1992 |
| JP | 5-1148 | 1/1993 |
| JP | 11-152335 | 6/1999 |
| JP | 2003-26799 | 1/2003 |
| JP | 2003-26800 | 1/2003 |

OTHER PUBLICATIONS

Shinji Ando et al., Perfluorinated Polyimide Synthesis, MACROMOLECULES, vol. 25, No. 21, 1992, p. 5858 and 5860.
Shinji Ando et al., "Synthesis of Perfluorinated Polyimides for Optical Applications", Polym. Mater. Sci and Eng., vol. 66, 1992, pp. 200-201.
Shinji Ando et al., "Synthesis of Perfluorinated Polyimides for Optical Applications", Polymers for Microelectronics, ACS Symposium Series 537, 1994, pp. 304-322.
Shinji Ando et al., "Synthesis and Properties of Perfluorinated Polyimides", Fluoropolymers 2: Properties, 1999, pp. 277-303.

*Primary Examiner*—Michelle Connelly-Cushwa
*Assistant Examiner*—Daniel Petkovsek
(74) *Attorney, Agent, or Firm*—Oblon, Spivak, McClelland, Maier & Neustadt, P.C.

(57) ABSTRACT

Several novel polyimide materials are disclosed. One example is a polyimide material comprising heterocyclic polyimide having an unit represented by the following general formula (1):

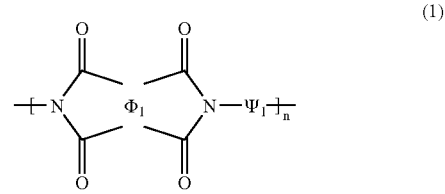

(wherein $\Phi_1$s may be the same or different and are individually a quadrivalent organic group, the $\Phi_1$s including at least 0.2 molar equivalent of a quadrivalent hetrocyclic group selected from the following Group (a), $\Psi_1$s may be the same or different and are individually a bivalent organic group, and n is a positive integer).

11 Claims, 4 Drawing Sheets

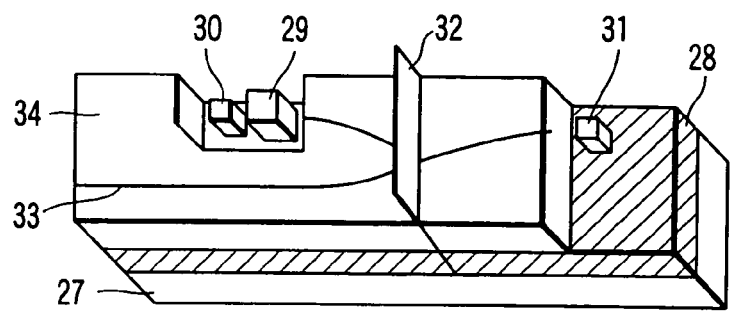
F I G. 9
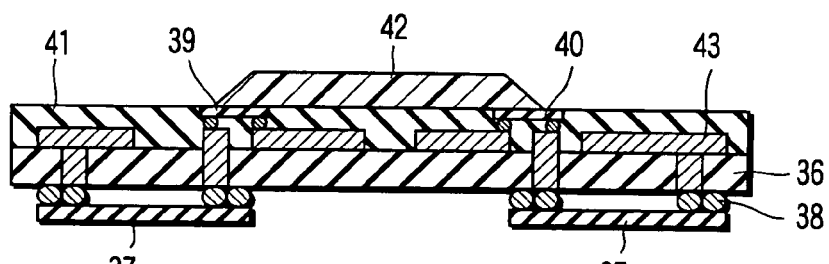
F I G. 10
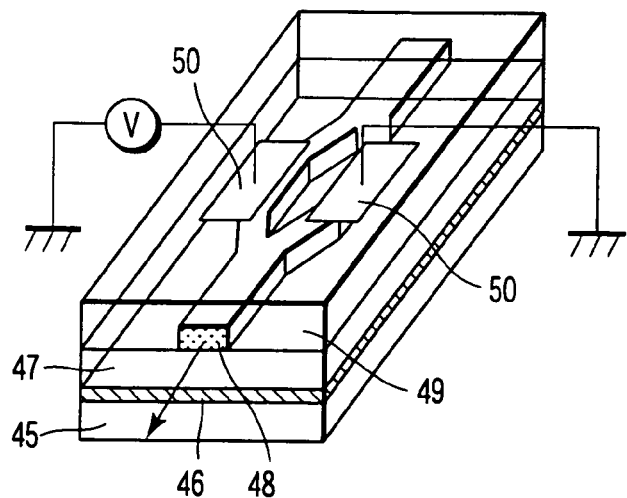
F I G. 11

POLYIMIDE OPTICAL MATERIALS, POLYIMIDE PRECURSOR SOLUTIONS AND OPTICAL WAVEGUIDE ELEMENTS

CROSS-REFERENCE TO RELATED APPLICATIONS

This application is a divisional of U.S. patent application Ser. No. 10/684,474, filed Oct. 15, 2003, now allowed, and claims the benefit of priority from the prior Japanese Patent Application No. 2002-318239, filed Oct. 31, 2002, in which the entire contents of both are incorporated herein by reference.

BACKGROUND OF THE INVENTION

1. Field of the Invention

The present invention relates to polyimide optical materials and an optical waveguide element where the polyimide optical materials ate employed. In particular, the present invention relates to polyimide which is useful as an optical material for the optical waveguide of an optoelectronic integrated circuit (OEIC) or of an optoelectronic mixed printed wiring board and to an optical waveguide element where such a polyimide is employed.

2. Description of the Related Art

Organic polymer materials are advantageous over inorganic materials, in that they are relatively light, excellent in impact resistance and workability, and easy to handle. Because of such advantages, organic polymer materials have been used extensively in optical components such as optical fiber, lenses, and substrate for optical disks.

There is a problem, however, if the polymer materials are employed as a medium for enabling a near-infrared ray for optical communication to transmit therethrough, for example as an optical waveguide of an OEIC or of an optoelectronic mixed printed wiring board, the problem being a relatively large light transmission loss as compared with inorganic materials. The causes for this can be generally classified into scattering and absorption. As the wavelength of light to be employed for the optical communication is shifted to the longer wavelength side (from 0.85 µm to 1.0 µm–1.7 µm), the infrared vibration which is intrinsic to the molecular structure of polymer materials is increasingly lost by harmonic absorption and this loss of the infrared vibration becomes predominant. As a result, it is now feared that the application of the polymer materials for use in the optical communication may become difficult.

In particular, polymethylmethacrylate (PMMA) and polystyrene (PS) which have been widely employed to date as an optical material for visible light, are formed of molecular structures having at least two carbon-hydrogen bond (C—H bond) in their molecules. Therefore, the near-infrared absorption spectra of these polymers include a plurality of absorption peaks which are large in width and intensity. To shift the harmonic absorption originating from this C—H bond toward the longer wavelength side, to minimize the intensity of the harmonic absorption, the employment of deuterium (D) or fluorine (F) to substitute for the intramolecular hydrogen has been proved to be effective. With respect to the materials where the hydrogen atoms in PMMA or PS are replaced by deuterium or fluorine, there have been already conducted fundamental studies. However, since these polymeric optical materials are not provided with sufficient soldering-heat resistance (260° C.) which is requisite in the fabrication of OEIC on the surface of a silicon substrate for instance, various measures will be necessitated in the fabrication process if the these polymeric optical materials are to be actually employed in the fabrication of OEIC, etc.

On the other hand, polyimide resin is known as ordinarily having a thermal decomposition temperature of as high as 400° C. or more, i.e. as one of the highest heat resistant resins among organic polymers, thus is now being studied to employ polyimide resin as an optical material.

For example, a coating material made of a fluorine-containing polyimide resin having hexafluoroisopropylidene group is now being studied for using it as a heat resistant material having an improved transparency. Further, there is proposed an optical waveguide formed of a fluorine-containing polyimide resin having hexafluoroisopropylidene group in the main chain thereof for the purpose of minimizing the light transmission loss.

However, the polyimide materials that have been conventionally studied, such as partially fluorinated polyimide, are accompanied with the following problems due to the fact that they contain a C—H bond of an aromatic ring in the molecular chain thereof. Namely, the near-infrared absorption spectra of these polyimide materials include a peak originating from the harmonics of the stretching vibration of C—H bond or from a combination vibration formed between the harmonics of the stretching vibration of C—H bond and the bending vibration. As a result, it is impossible to achieve the minimization of light transmission loss throughout the entire wavelength zone for optical transmission (1.0 µm to 1.7 µm).

Under the circumstances, it is now studied to employ, as a coating material, a fully fluorinated polyimide resin where all of hydrogen atoms in C—H bonds are substituted by fluorine atoms, and there is proposed an optical waveguide which is formed of this full fluorinated polyimide resin.

Although it is possible, with the employment of this full fluorinated polyimide resin, to achieve the minimization of light transmission loss throughout the entire wavelength zone for optical transmission (1.0 µm to 1.7 µm), the hydrogen radicals thereof are all substituted by fluorine atoms, resulting in an excess introduction of fluorine atoms. Accordingly, due to this excess fluorine group, the solvent resistance, as well as the heat resistance, which are characteristic of the conventional polyimide material, are caused to greatly deteriorate in this fully fluorinated polyimide resin, and at the same time, the workability thereof for forming optical elements as well as the solder reflow property thereof are caused to greatly deteriorate, thus obstructing the utility of this fully fluorinated polyimide resin as a material for the manufacture of the optical waveguide of an optical element.

Although other fluorinated polyimides have been proposed, no one has succeeded in providing an organic polymer material which is capable of meeting not only a high light transmitting property throughout the entire wavelength zone for optical communication but also other properties such as the solvent resistance and the heat resistance, all of which are required in the materials for manufacturing the optical waveguide of an optical element. Therefore, there is an earnest desire to develop an organic polymer optical material having all of the aforementioned properties.

Therefore, one of the objects of the present invention is to provide a polyimide optical material which is provided with sufficient heat resistance and solvent resistance demanded for the manufacture of an optoelectronic integrated circuit and which can be employed as an organic polymer optical material exhibiting an extremely low light transmission loss in the near infrared zone, in particular, throughout the entire wavelength zone for optical transmission (1.0 µm to 1.7 µm).

Another object of the present invention is to provide a polyimide precursor solution that is useful for synthesizing the aforementioned polyimide optical material.

A further object of the present invention is to provide an optical waveguide element which can be easily manufactured and is excellent in heat resistance and minimal in light transmission loss.

BRIEF SUMMARY OF THE INVENTION

According to one aspect of the present invention, there is provided a polyimide material comprising heterocyclic polyimide having a repeating unit represented by the following general formula (1), (2) or (3):

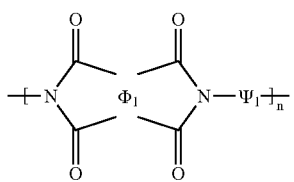
(1)

(wherein $\Phi_1$s may be the same or different and are individually a quadrivalent organic group, the $\Phi_1$s including at least 0.2 molar equivalent of a quadrivalent hetrocyclic group selected from the following Group (a); $\Psi_1$s may be the same or different and are individually a bivalent organic group; and n is a positive integer).

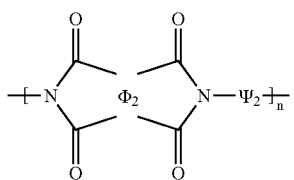
(2)

(wherein $\Phi_2$s may be the same or different and are individually a quadrivalent organic group; $\Psi_2$s may be the same or different and are individually a bivalent organic group, the $\Psi_2$s including at least 0.2 molar equivalent of a bivalent hetrocyclic group selected from the following Group (b); and n is a positive integer).

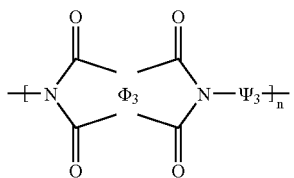
(3)

(wherein $\Phi_3$s may be the same or different and are individually a quadrivalent organic group, the $\Phi_3$s including at least 0.1 molar equivalent of a quadrivalent hetrocyclic group selected from the following Group (a); $\Psi_3$s may be the same or different and are individually a bivalent organic group, the $\Psi_3$s including at least 0.1 molar equivalent of a bivalent hetrocyclic group selected from the following Group (b); and n is a positive integer):

Group (a):

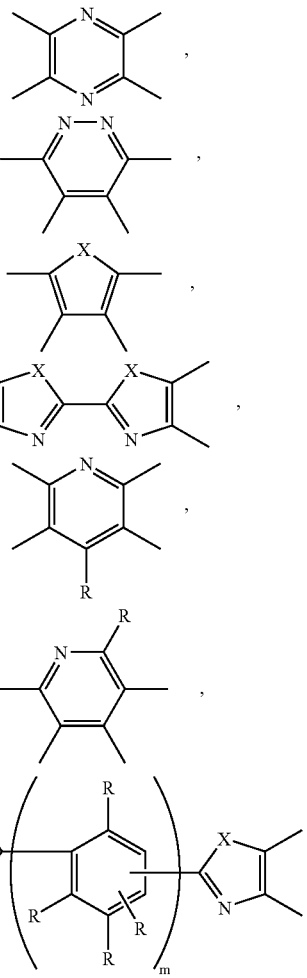

Group (b):

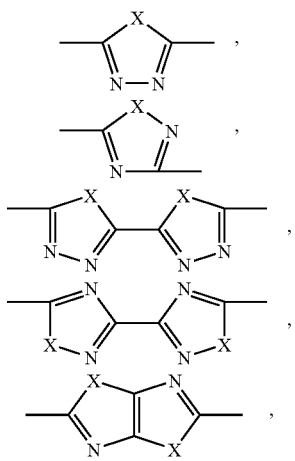

-continued

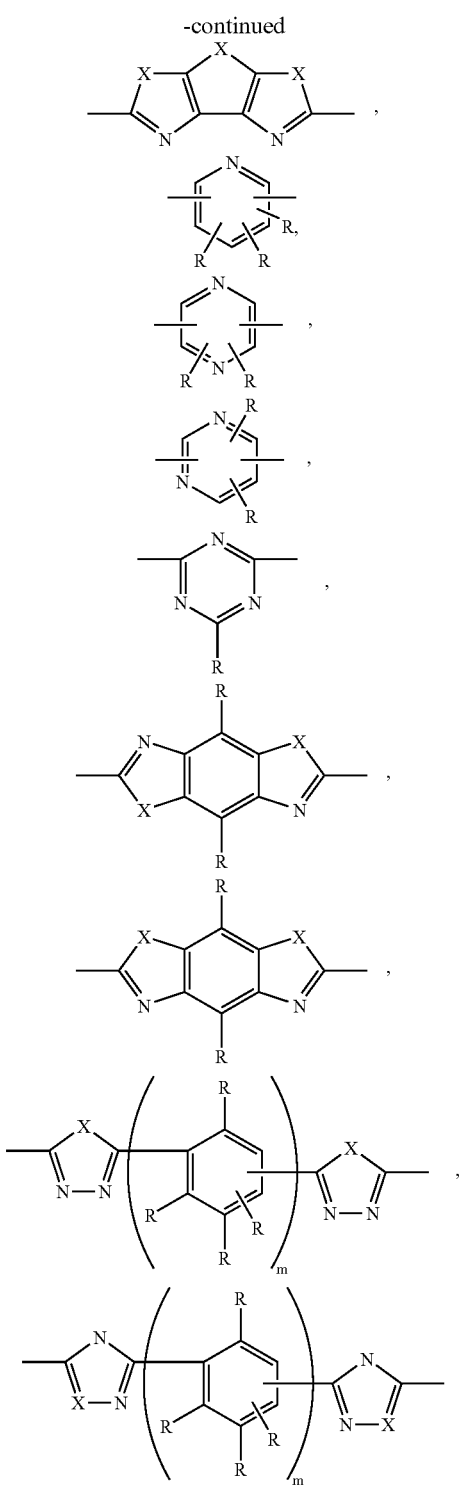

(In the above formulas, X may be the same or different and are individually >O group, >S group or >N—R$^f$ group (R$^f$ group is perfluoroalkyl group); R may be the same or different and are individually fluoro group, chloro group, bromo group, iodo group, perfluoroalkyl group, perfluoroalkoxy group, perfluoroalkylthio group, nitro group or cyano group; m is an integer of 1 to 4)

According to another aspect of the present invention, there is provided a polyimide precursor solution comprising heterocyclic polyamic acid having a repeating unit represented by the following general formula (4), (5) or (6):

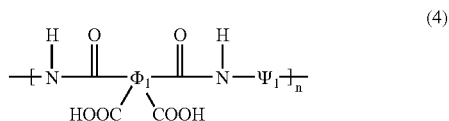

(4)

(wherein $\Phi_1$s may be the same or different and are individually a quadrivalent organic group, the $\Phi_1$s including at least 0.2 molar equivalent of a quadrivalent hetrocyclic group selected from the following Group (a); $\Psi_1$s may be the same or different and are individually a bivalent organic group; and n is a positive integer).

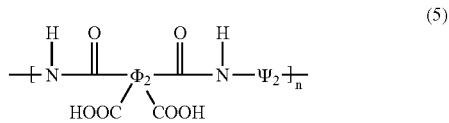

(5)

(wherein $\Phi_2$s may be the same or different and are individually a quadrivalent organic group; $\Psi_2$s may be the same or different and are individually a bivalent organic group, the $\Psi_2$s including at least 0.2 molar equivalent of a bivalent hetrocyclic group selected from the following Group (b); and n is a positive integer).

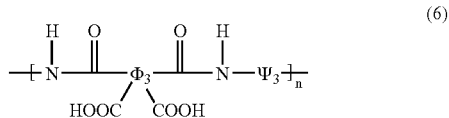

(6)

(wherein $\Phi_3$s may be the same or different and are individually a quadrivalent organic group, the $\Phi_3$s including at least 0.1 molar equivalent of a quadrivalent hetrocyclic group selected from the following Group (a); $\Psi_3$s may be the same or different and are individually a bivalent organic group, the $\Psi_3$s including at least 0.1 molar equivalent of a bivalent hetrocyclic group selected from the following Group (b); and n is a positive integer).

Group (a):

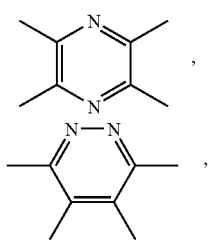

-continued

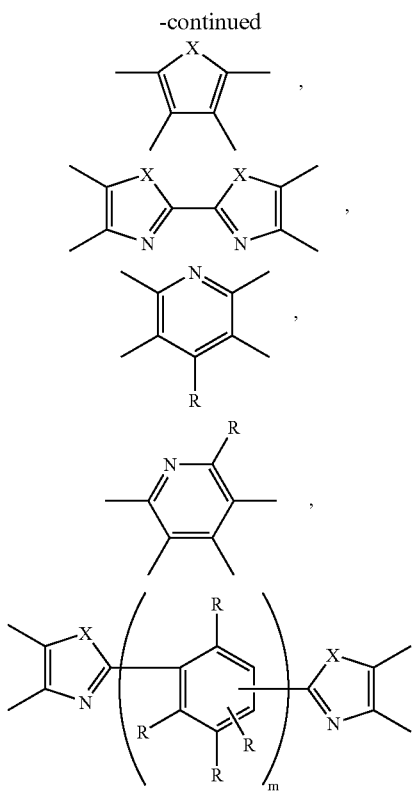

Group (b):

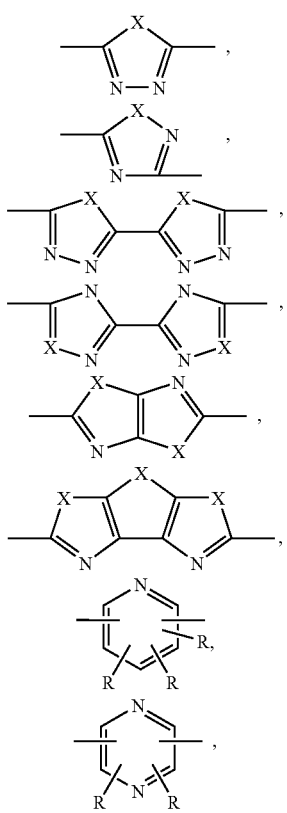

-continued

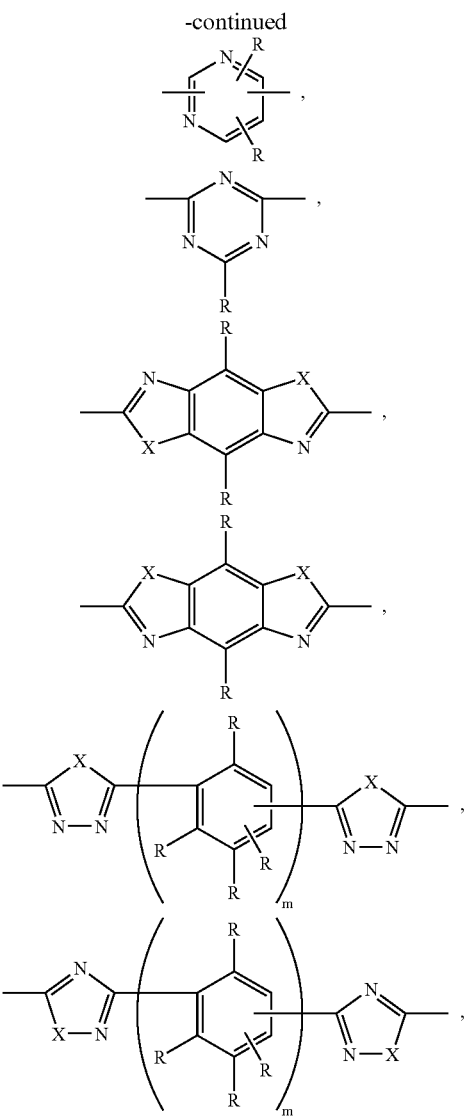

(In the above formulas, X may be the same or different and are individually >O group, >S group or >N—$R^f$ group ($R^f$ group is perfluoroalkyl group); R may be the same or different and are individually fluoro group, chloro group, bromo group, iodo group, perfluoroalkyl group, perfluoroalkoxy group, perfluoroalkylthio group, nitro group or cyano group; m is an integer of 1 to 4)

According to another aspect of the present invention, there is provided an optical waveguide element comprising a core layer, and a clad layer, wherein the core layer and/or the clad layer comprise a polyimide optical material of one embodiment of the present invention.

BRIEF DESCRIPTION OF THE SEVERAL VIEWS OF THE DRAWINGS

FIG. 9 is a perspective view illustrating the structure of a bidirectional light transmitting module manufactured in one example;

FIG. 10 is a cross-sectional view illustrating the structure of a photoelectric composite wiring board which was manufactured in one example; and FIG. 11 is a perspective view illustrating a light modulator which was manufactured in one example.

DETAILED DESCRIPTION OF THE INVENTION

Figure 1:
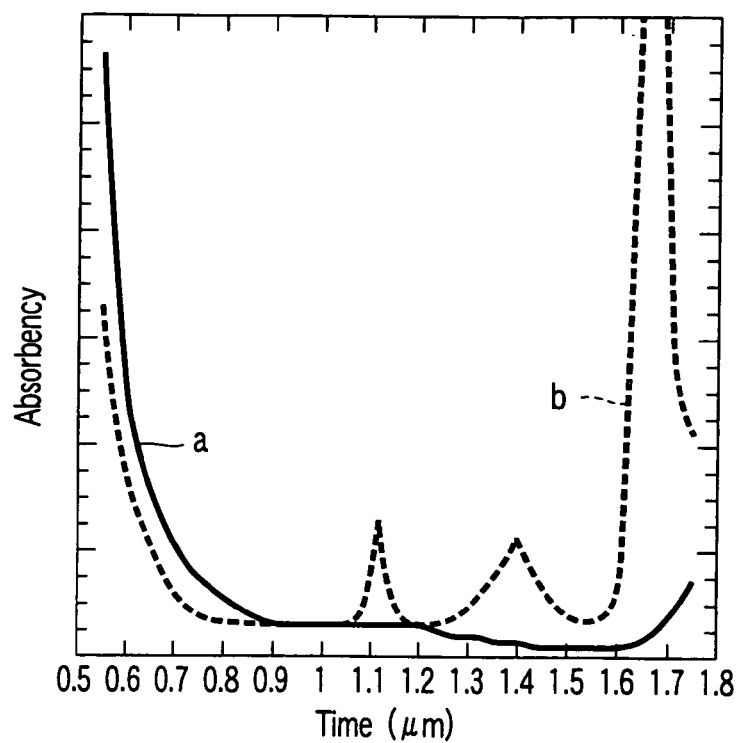
FIG. 1 shows an absorption spectrum of a polyimide film.

This invention will be further explained as follows.

To the $\Phi_1$s and $\Phi_3$s of the aforementioned general formulas (1) and (3), a predetermined quantity of a quadrivalent hetrocyclic group selected from the aforementioned Group (a) is required to be introduced. As for the quadrivalent hetrocyclic group, it is possible to employ, for example, pyrazinetetrayl group, pyridazinetetrayl group, furantetrayl group, thiophenetetrayl group, N-(perfluoroalkyl) pyrroletetrayl group, bioxazoletetrayl group, bithiazoletetrayl group, and N,N'-bis(perfluoroalkyl) bipyrazoletetrayl group. It is also possible to employ, as the quadrivalent hetrocyclic group, pyridinetetrayl group, phenylene dioxazoletetrayl group and phenylene dithiazoletetrayl group, where all of hydrogen radicals in these groups are substituted by fluoro group, chloro group, bromo group, iodo group, perfluoroalkyl group, perfluoroalkoxy group, perfluoroalkylthio group, nitro group or cyano group.

These quadrivalent hetrocyclic groups are required to be included as the $\Phi_1$s in the compound of aforementioned general formula (1) at a ratio of at least 0.2 molar equivalent and as the $\Phi_3$s in the compound of aforementioned general formula (3) at a ratio of at least 0.1 molar equivalent.

To the $\Psi_2$s and $\Psi_3$s of the aforementioned general formulas (2) and (3), a predetermined quantity of a bivalent hetrocyclic group selected from the aforementioned Group (b) is required to be introduced. As for the bivalent hetrocyclic group, it is possible to employ, for example, oxadiazoldiyl group, thiadiazoldiyl group, N-(perfluoroalkyl)triazoldiyl group, bioxadiazoldiyl group, bithiadiazoldiyl group, N,N1-bis(perfluoroalkyl)bitriazolediyl group, thiazolothiazolediyl group, and thiazolothienothiazoldiyl group. It is also possible to employ, as the bivalent hetrocyclic group, pyridindiyl group, pyrimidindiyl group, pyrazindiyl group, pyridazindiyl, triazindiyl, benzobisoxazoldiyl, benzobisthiazoldiyl, phenylene dioxadiazoldiyl and phenylene dithiazoldiyl group, where all of hydrogen radicals in these groups are substituted by fluoro group, chloro group, bromo group, iodo group, perfluoroalkyl group, perfluoroalkoxy group, perfluoroalkylthio group, nitro group or cyano group.

These bivalent hetrocyclic groups are required to be included as the $\Psi_2$s in the compound of aforementioned general formula (2) at a ratio of at least 0.2 molar equivalent and as the $\Psi_3$s in the compound of aforementioned general formula (3) at a ratio of at least 0.1 molar equivalent.

Namely, all of the hetrocyclic polyimides each having a repeating unit represented by any one of the aforementioned general formulas (1), (2) and (3) are required to include at least 0.2 molar equivalent of specific heterocyclic groups.

Since these heterocyclic groups contain no hydrogen radical, the heterocyclic polyimide materials to be obtained therefrom are free from C—H bond which may become a cause for inviting loss of light transmission in the near infrared wavelength zone. Therefore, it is possible to secure low light transmission loss throughout the entire wavelength zone for optical transmission (1.0 µm to 1.7 µm). Moreover, the resultant polyimide material will be prevented from being excessively introduced with fluorine atoms, thus making it possible to improve the heat resistance and solvent resistance of the polyimide material. In order to sufficiently secure the aforementioned effects, the content of the heterocyclic group containing no hydrogen radical should preferably be controlled to at least 0.2 molar equivalent.

Further, although there is no particular limitation with regard to the range of the positive integer "n" in the aforementioned general formulas (1), (2) and (3), if "n" is too small, i.e. the molecular weight of the polyimide is too small, it may not be possible to provide the polyimide resin with satisfactory coatability and heat resistance. On the other hand, if "n" is too large, i.e. the molecular weight of the polyimide is too large, the handling of the polyimide material would become difficult. In order to avoid the aforementioned problems, it is preferable to confine "n" within the range of 5 to 200.

In the substituent groups shown in the aforementioned Groups (a) and (b), the range of "m" should preferably be within the range of 1 to 4. Because if "m" is 5 or more, the substituent group would become excessively large, thereby possibly losing the excellent heat resistance, i.e. one of the inherent characteristics of polyimide.

The balance of the $\Phi_1$s in the aforementioned general formula (1), the balance of the $\Phi_3$s in the aforementioned general formula (3) and the $\Phi_2$s in the aforementioned general formula (2) may be constituted by the following quadrivalent organic groups. Namely, they may be hydrocarbon groups including, for example, benzentetrayl group, naphthalentetrayl group, perylentetrayl group, anthracentetrayl group, phenanthrentetrayl group, pyrentetrayl group, biphenyltetrayl group, terphenyltetrayl group, quaterphenyltetrayl group, quinquephenyltetrayl group, diphenylmethantetrayl group, diphenylethantetrayl group, diphenylpropantetrayl group, diphenylbutantetrayl group, diphenylpentantetrayl group, benzophenontetrayl group, diphenylethertetrayl group, diphenylsulfidtetrayl group, diphenylsulfontetrayl group, diphenyldimethylsilantetrayl group, diphenyltetramethyldisiloxantetrayl group, diphenoxybenzentetrayl group, diphenoxybiphenyltetrayl group, bis(phenoxyphenyl)ethertetrayl group, bis(phenoxyphenyl) sulfontetrayl group, bis(phenoxyphenyl)propantetrayl group, anthraquinontetrayl group, phenathrenequinontetrayl group, fluorentetrayl group, fluorenontetrayl group, diphenylfluorentetrayl group, xanthentetrayl group, ethantetrayl group, cyclopentantetrayl group, cyclohexanetetrayl group, and bicyclohexyltetrayl group.

These quadrivalent organic groups may be substituted by the following characteristic groups. Namely, examples of the characteristic groups include di-substituted amino group (dimethylamino, diethylamino, dibutylamino, ethylmethylamino, butylmethylamino, diamylamino, dibenzylamino, diphenethylamino, diphenylamino, ditolylamino, dixylylamino, methylphenylamino and benzylmethylamino group); mono-substituted amino group (methylamino, ethylamino, propylamino, isopropylamino, tert-butylamino, anilino, anicisino, phenetidino, toluidino, xylidino, pyridylamino, thiazolylamino, benzylamino and benzylideneamino group); cyclic amino group (pyrrolidino, piperidino, piperazino, morpholino, 1-pyrrolyl, 1-pirazolyl, 1-imidazolyl and 1-triazolyl group); acylamino group (formylamino, acetylamino, benzoylamino, cinnamoylamino, pyridinecarbonylamino and trifluoroacetylamino group); sulfonylamino group (mesylamino, ethylsulfonylamino, phenylsulfonylamino, pyridylsufonylamino, tosylamino, taurylamino, trifluoromethylsulfonylamino, sulfamoylamino, methylsulfamoylamino, sulfanylamino and acetylsulfanylamino group); amino group; hydroxyamino group; ureide group; semicarbazide group; carbazide group; di-substituted hydrazino group (dimethylhydrazino, diphenylhydrazino and methylphenylhydrazino group); mono-substituted hydrazino group (methylhydrazino, phenylhydrazino, pyridylhydrazino and benzylidenehydrazino group); hydrazino group; amidino group; oxime group (hydroxyiminomethyl, methoxyiminomethyl, ethoxyiminomethyl, hydroxyiminoethyl, hydroxyiminopropyl group, etc.); hydroxyl group; oxy group (methoxy, ethoxy, propoxy, butoxy, hydroxyethoxy, phenoxy, naphthoxy, pyridyloxy, thiazolyloxy and acetoxy group); thio group (methylthio, ethylthio, phenylthio, pyridylthio and thiazolylthio group); alkoxyalkyl group (hydroxymethyl, hydroxyethyl and hydroxypropyl group); cyano group; cyanate group; thiocyanate group; nitro group; nitroso group; mercapto group; halogen group (fluoro, chloro, bromo and iodo group); carboxyl group and the salts thereof; oxycarbonyl group (methoxycarbonyl, ethoxycarbonyl, phenoxycarbonyl and pyridyloxycarbonyl group); aminocarbonyl group (carbamoyl, methylcarbamoyl, phenylcarbamoyl, pyridylcarbamoyl, carbazoyl, allophanoyl, oxamoyl and succinamoyl group); thiocarboxyl and the salts thereof; dithiocarboxyl and the salts thereof; thiocarbonyl group (methoxythiocarbonyl, methylthiocarbonyl and methylthio-thiocarbonyl group); acyl group (formyl, acetyl, propionyl, acryloyl, benzoyl, cinnamoyl, pyridinecarbonyl, thiazolecarbonyl and trifluoroacetyl group); thioacyl group (thioformyl, thioacetyl, thiobenzoyl and pyridinethiocarbonyl); sulfinic acid radical and the salts thereof; sulfonic acid radical and the salts thereof; sulfinyl group (methylsulfinyl, ethylsulfinyl and phenylsulfinyl group); sulfonyl group (mesyl, ethylsulfonyl, phenylsulfonyl, pyridylsulfonyl, tosyl, tauryl, trifluoromethylsulfonyl, sulfamoyl, methylsulfamoyl, sulfanilyl and acetylsulfanilyl group); oxysulfonyl group (methoxysulfonyl, ethoxysulfonyl, phenoxysulfonyl, acetaminopheoxysulfonyl and pyridyloxysulfonyl group); thiosulfonyl group (methylthiosulfonyl, ethylthiosulfonyl, phenylthiosulfonyl, acetaminophenylthiosulfonyl and pyridylthiosulfonyl group); aminosulfonyl group (sulfamoyl, methylsulfamoyl, dimethylsulfamoyl, ethylsulfamoyl, diethylsulfamoyl, phenylsulfamoyl, acetaminophenylsulfamoyl and pyridylsulfamoyl group); ammonio group (trimethylammonio, ethyldimethylammonio, dimethylphenylammonio, pyridinio and quinolinio group); azo group (phenylazo, pyridylazo and thiazolylazo group); azoxy group; alkyl halide group (chloromethyl, bromomethyl, fluoromethyl, dichloromethyl, dibromomethyl, difluoromethyl, trifluoromethyl, pentafluoroethyl and heptafluoropropyl group); organosilicic group (silyl, disilanyl, trimethylsilyl and triphenylsilyl group).

The balance of the $\Psi_2$s in the aforementioned general formula (2), the balance of the $\Psi_3$s in the aforementioned general formula (3) and the $\Psi_1$s in the aforementioned general formula (1) may be constituted by the following bivalent organic groups. Namely, they may be hydrocarbon groups including, for example, phenylene group, naphthalendiyl group, perylendiyl group, anthracendiyl group, phenanthrendiyl group, pyrendiyl group, biphenyldiyl group, terphenyldiyl group, quaterphenyldiyl group, quinquephenyldiyl group, diphenylmethandiyl group, diphenylethandiyl group, diphenylpropandiyl group, diphenylbutandiyl group, diphenylpentandiyl group, benzophenondiyl group, diphenyletherdiyl group, diphenylsulfidediyl group, diphenylsulfondiyl group, diphenyldimethylsilandiyl group, diphenyltetramethyldisiloxandiyl group, diphenoxybenzendiyl group, diphenoxybiphenyldiyl group, bis(phenoxyphenyl)etherdiyl group, bis(phenoxyphenyl)sulfondiyl group, bis(phenoxyphenyl)propandiyl group, anthraquinondiyl group, phenathrenequinondiyl group, fluorendiyl group, fluorenondiyl group, diphenylfluorendiyl group, xanthendiyl group, methylene group, ethyelene group, propylene group, cyclopentandiyl group, cyclohexandiyl group, bicyclohexyldiyl group and dipropyltetramethyl-disiloxanediyl group.

These divalent organic groups may be substituted by the aforementioned characteristic groups.

The quadrivalent heterocyclic groups to be introduced, as $\Phi_1$s, into the aforementioned general formula (1) may be selected from quadrivalent aromatic heterocyclic groups shown in the following Group (c), and the balance of the $\Phi_1$s may be selected from quadrivalent fluorine-substituted aromatic hydrocarbon groups shown in the following Group (e).

Group (c):

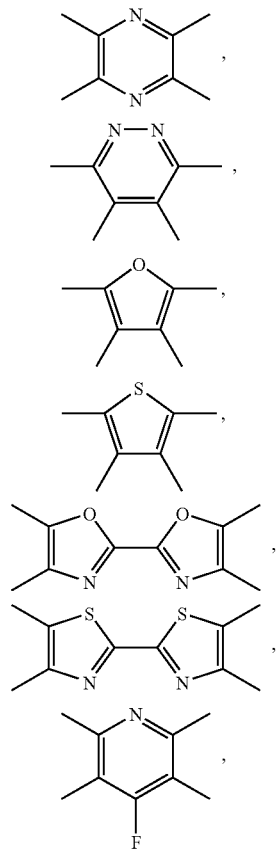

-continued
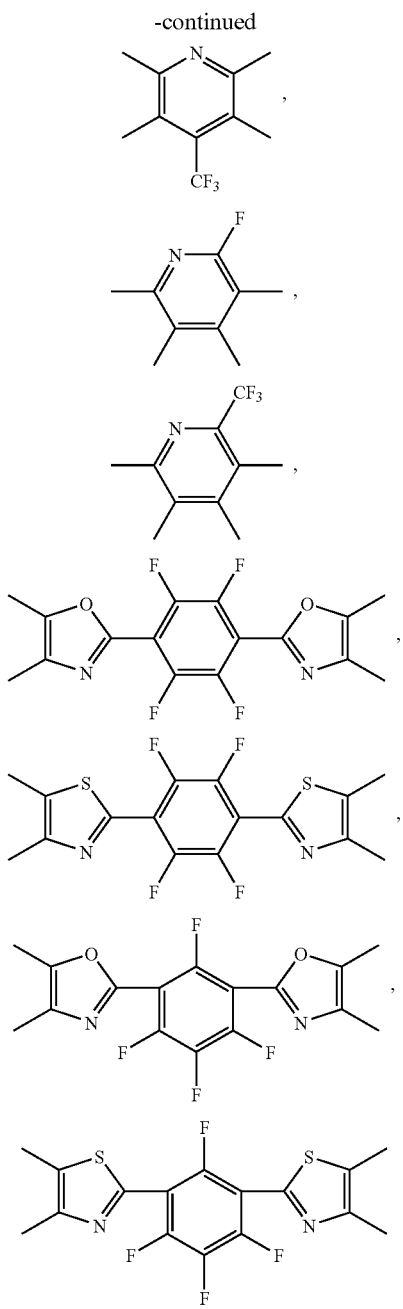
Group (e)=:
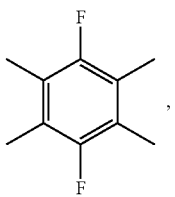
-continued
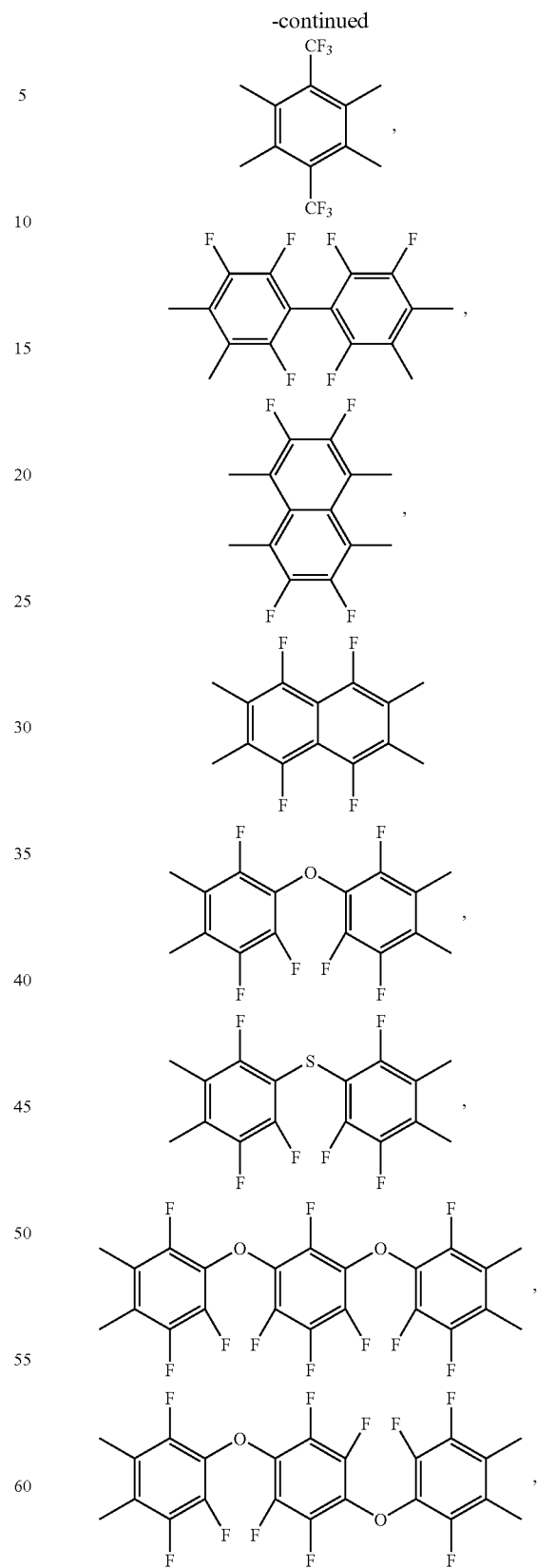

-continued

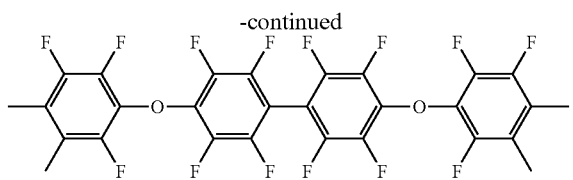

The quadrivalent aromatic hetrocyclic substituent groups shown in the above Group (c) can be introduced, as $\Phi_3$s, into the aforementioned general formula. (3), and the quadrivalent fluorine-substituted aromatic hydrocarbon groups shown in the above Group (e) can be introduced, as $\Phi_2$s, into the aforementioned general formula (2) or, as the balance of $\Phi_3$s, into the aforementioned general formula (3).

The bivalent organic groups to be introduced, as $\Psi_1$s, into the aforementioned general formula (1) may be selected from the bivalent fluorine-substituted aromatic hydrocarbon groups shown in the following Group (f).

Group (f):

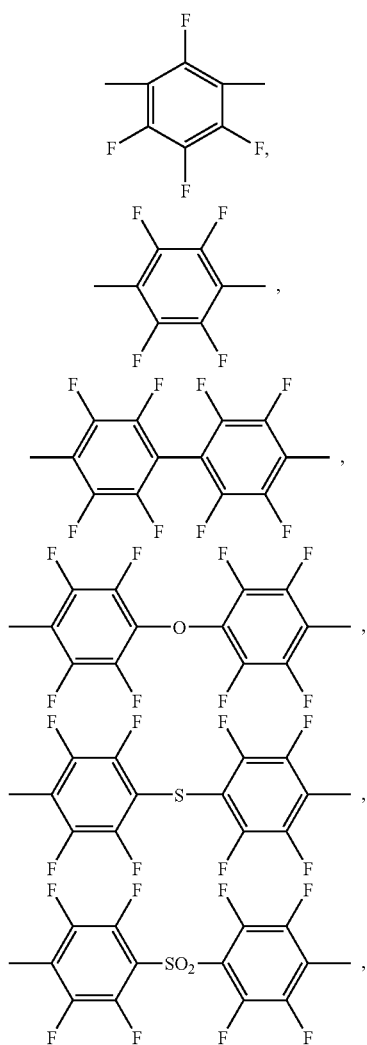

-continued

The bivalent fluorine-substituted aromatic hydrocarbon groups shown in the above Group (f) can be introduced, as $\Psi_2$, into the aforementioned general formula (2) or, as the balance of $\Phi_3$, into the aforementioned general formula (3).

The bivalent organic groups to be introduced, as $\Psi_2$s, into the aforementioned general formula (2) may be selected from the bivalent aromatic heterocyclic groups shown in the following Group (d).

Group (d):

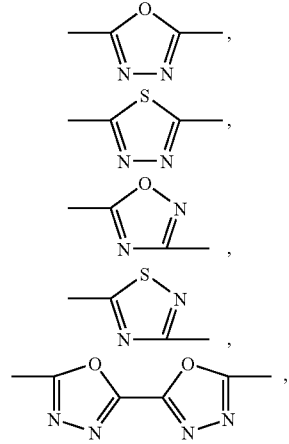

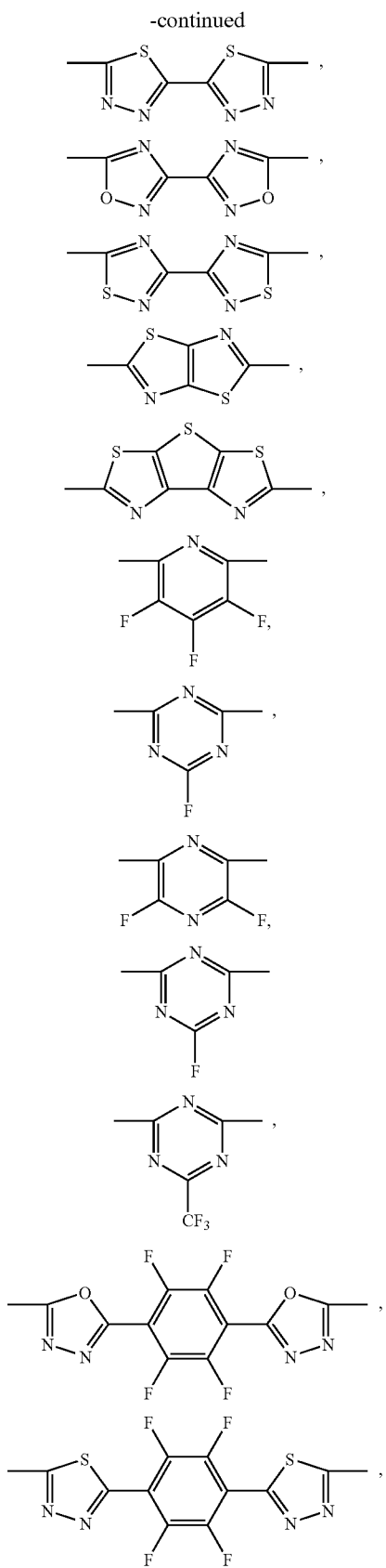

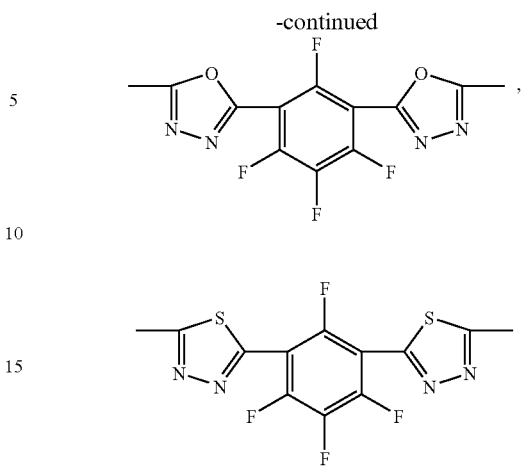

The bivalent aromatic hydrocarbon groups shown in the above Group (d) can be introduced, as $\Psi_3$, into the aforementioned general formula (3).

As already explained, the aromatic heterocyclic groups shown in the Groups (c) and (d) as well as the fluorine-substituted aromatic hydrocarbon groups shown in the Groups (e) and (f) contain no hydrogen radical at all. Therefore, the heterocyclic polyimide materials to be obtained from a combination of these substituent groups are free from C—H bond which may become a cause for inviting loss of light transmission in the near infrared wavelength zone or optical communication zone. Therefore, it is possible to secure low light transmission loss throughout the entire wavelength zone for optical transmission (1.0 μm to 1.7 μm).

Due to the introduction of the aromatic heterocyclic groups shown in the Groups (c) and (d) into the polyimide material, it is possible to inhibit an excessive introduction of fluorine atoms. As a result, it is now possible to suppress the deterioration of heat resistance and solvent resistance of the polyimide material. Incidentally, in the case of the conventional fully fluorinated polyimide, a difference in refractive index among the substituent groups is relatively small, thus it has been difficult to alter the refractive index. Whereas, in the case of the polyimide optical materials to be obtained according to the embodiments of the present invention, a difference in refractive index between the aromatic heterocyclic groups shown in the Groups (c) and (d) and the full fluorine-substituted aromatic hydrocarbon group shown in the Groups (e) and (f) is relatively large, so that it is possible, through the alteration of the ratio of these substituent groups to be introduced, to optionally control the refractive index.

In the repeating units represented by the aforementioned general formulas (1), (2) and (3), the content of fluorine atoms in each repeating unit should preferably be within the ratio of 5 to 40% by weight.

If the content of fluorine atoms in each repeating unit is larger than 40% by weight, it may lead to a considerable degree of deterioration of the heat resistance and solvent resistance of the polyimide optical material to be obtained. On the other hand, if the content of fluorine atoms in each repeating unit is smaller than 5% by weight, it may lead to an increase in rate of moisture absorption of the polyimide optical material to be obtained, which may lead to the deterioration of the property of the polyimide material to secure low light transmission loss throughout the entire wavelength zone for optical transmission. In order to ensure better heat resistance, solvent resistance and anti-moisture absorption property of the polyimide optical material to be obtained, the content of fluorine atoms in each repeating unit should preferably be confined within the range of 15 to 35% by weight.

All of the hetrocyclic polyimides each having a repeating unit represented by any one of the aforementioned general formulas (1), (2) and (3) can be produced using, as a raw material, the heterocyclic polyamic acids having a repeating unit represented by any one of the following general formulas (4), (5) and (6).

Namely, the polyimide precursor solution according to the present invention is featured in that it comprises heterocyclic polyamic acid having a repeating unit represented by the following general formula (4), (5) or (6):

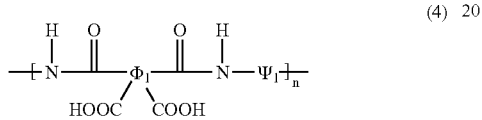

(4)

(wherein $\Phi_1$s may be the same or different and are individually a quadrivalent organic group, the $\Phi_1$s including at least 0.2 molar equivalent of a quadrivalent hetrocyclic group selected from the following Group (a); $\Psi_1$s may be the same or different and are individually a bivalent organic group; and n is a positive integer).

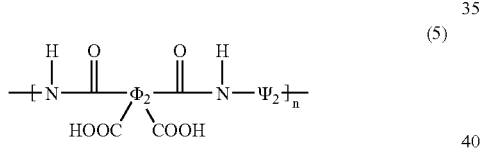

(5)

(wherein $\Phi_2$s may be the same or different and are individually a quadrivalent organic group; $\Psi_2$s may be the same or different and are individually a bivalent organic group, the $\Psi_2$s including at least 0.2 molar equivalent of a bivalent hetrocyclic group selected from the following Group (b); and n is a positive integer).

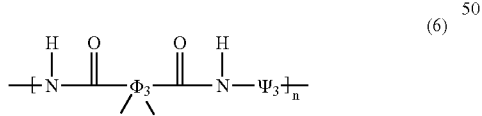

(6)

(wherein $\Phi_3$s may be the same or different and are individually a quadrivalent organic group, the $\Phi_3$s including at least 0.1 molar equivalent of a quadrivalent hetrocyclic group selected from the following Group (a); $\Psi_3$s may be the same or different and are individually a bivalent organic group, the $\Psi_3$s including at least 0.1 molar equivalent of a bivalent hetrocyclic group selected from the following Group (b); and n is a positive integer).

Group (a):

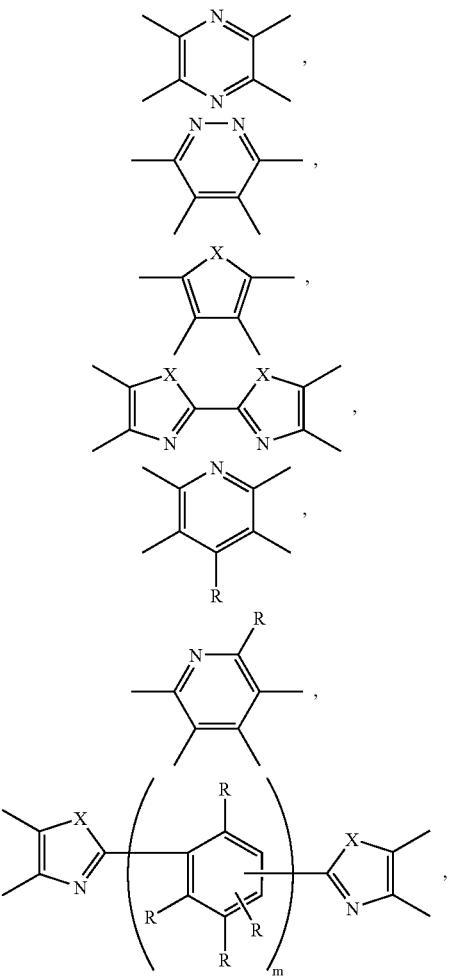

Group (b):

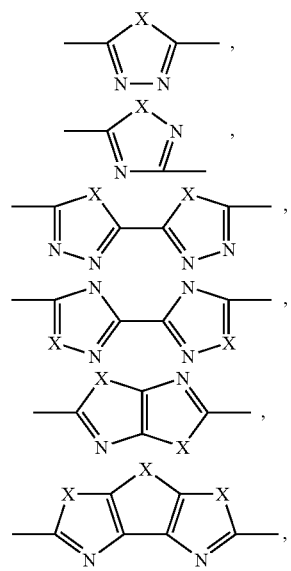

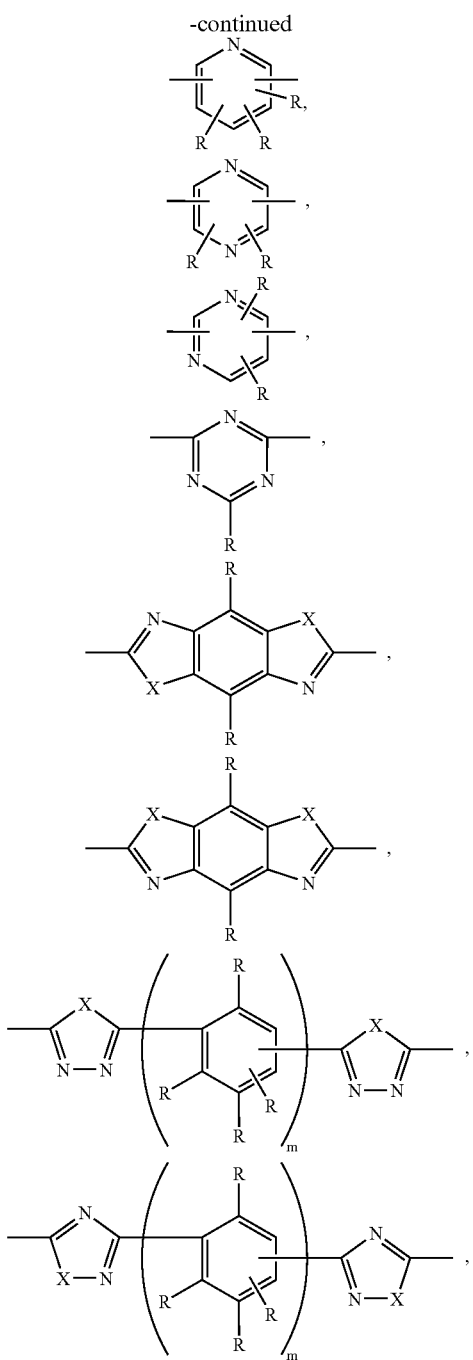

(In the above formulas, X may be the same or different and are individually >O group, >S group or >N—R$^f$ group (R$^f$ group is perfluoroalkyl group); R may be the same or different and are individually fluoro group, chloro group, bromo group, iodo group, perfluoroalkyl group, perfluoroalkoxy group, perfluoroalkylthio group, nitro group or cyano group; m is an integer of 1 to 4)

To the $\Phi_1$s and $\Phi_3$s of the aforementioned general formulas (4) and (6), a predetermined quantity of a quadrivalent, hetrocyclic group selected from the aforementioned Group (a) is required to be introduced. As for the quadrivalent hetrocyclic group, it is possible to employ the same hetrocyclic groups as illustrated with reference to the aforementioned general formulas (1) and (3).

To the $\Psi_2$s and $\Psi_3$s of the aforementioned general formulas (5) and (6), a predetermined quantity of a bivalent hetrocyclic group selected from the aforementioned Group (b) is required to be introduced. As for the bivalent hetrocyclic group, it is possible to employ the same hetrocyclic groups as illustrated with reference to the aforementioned general formulas (2) and (3).

The balance of the $\Phi_1$s in the aforementioned general formula (4), the balance of the $\Phi_3$s in the aforementioned general formula (6) and the $\Phi_2$s in the aforementioned general formula (5) may be constituted by the aforementioned substituted or unsubstituted hydrocarbon groups as a quadrivalent group.

The balance of the $\Psi_2$s in the aforementioned general formula (5), the balance of the $\Psi_2$s in the aforementioned general formula (6) and the $\Psi_1$s in the aforementioned general formula (4) may be constituted by the aforementioned substituted or unsubstituted hydrocarbon groups as a bivalent group.

As for the method of synthesizing the polyamic acid represented by the aforementioned general formulas (4) to (6), there is no particular limitation, thus any method can be employed. It is particularly preferable to employ a method wherein tetracarboxylic dianhydride and a diamine compound are polymerized in an inert gas atmosphere and in an organic polar solvent without the presence of water.

On the occasion of introducing quadrivalent hetrocyclic groups shown in the aforementioned group (a) into $\Phi_1$s of the aforementioned general formula (4) and into $\Phi_3$s of the aforementioned general formula (6), it is possible to employ hetrocyclic tetracarboxylic dianhydride. For example, it is possible to employ heterocyclic tetracarboxylic dianhydrides, examples include unsubstituted heterocyclic tetracarboxylic dianhydride such as pyrazine tetracarboxylic dianhydride, pyridazine tetracarboxylic dianhydride, furan tetracarboxylic dianhydride, thiophene tetracarboxylic dianhydride, bioxazole tetracarboxylic dianhydride and bithiazole tetracarboxylic dianhydride; and substituted heterocyclic tetracarboxylic dianhydride such as pyridine tetracarboxylic dianhydride, phenylene bis(oxazole dicarboxylic) dianhydride, phenylene bis(thiazole dicarboxylic) dianhydride, bifuran tetracarboxylic dianhydride and bithiophene tetracarboxylic dianhydride, where all of hydrogen radicals in these tetracarboxylic dianhydride, are substituted by a substituent group such as halogen group, perfluoroalkyl group, perfluoroalkoxy group, nitro group or cyano group.

Especially preferable examples of the heterocyclic tetracarboxylic dianhydride include unsubstituted heterocyclic tetracarboxylic dianhydride such as pyrazine-2,3,5,6-tetracarboxylic dianhydride, pyridazine-3,4,5,6-tetracarboxylic dianhydride, furan-2,3,4,5-tetracarboxylic dianhydride, thiophene-2,3,4,5-tetracarboxylic dianhydride, 2,2'-bioxazole-4,4',5,5'-tetracarboxylic dianhydride and 2,2'-bithiazole-4,4',5,5'-tetracarboxylic dianhydride; 4-fluoropyrizine-2,3,5,6-tetracarboxylic dianhydride; 2-fluoropyrizine-3,4,5,6-tetracarboxylic dianhydride; 4-(trifluoromethyl)pyrizine-2,3,5,6-tetracarboxylic dianhydride; 2-(trifluoromethyl)pyrizine-3,4,5,6-tetracarboxylic dianhydride; 2,3,5,6-tetrafluoro-1,4-phenylene-2,2'-bis(oxazole-4,5-dicarboxylic)dianhydride; 2,3,5,6-tetrafluoro-1,4-phenylene-2,2'-bis(thiazole-4,5-dicarboxylic)dianhydride; 2,4,5,6-tetrafluoro-1,3-phenylene-2,2'-bis(oxazole-4,5-dicarboxylic)dianhydride; and 2,4,5,6-tetrafluoro-1,3-phenylene-2,2'-bis(thiazole-4,5-dicarboxylic)dianhydride.

On the occasion of introducing substituted or unsubstituted hydrocarbon group as a quadrivalent substituent group into the balance of $\Phi_1$s of the aforementioned general formula (4), into the balance of $\Phi_3$s of the aforementioned general formula (6), and into $\Phi_2$s of the aforementioned general formula (5), it is possible to employ the following tetracarboxylic dianhydride.

For example, it is possible to employ pyromellitic dianhydride, benzene tetracarboxylic dianhydride, benzophenone tetracarboxylic dianhydride, biphenyl tetracarboxylic dianhydride, terphenyl tetracarboxylic dianhydride, quaterphenyl tetracarboxylic dianhydride, methylene diphthalic dianhydride, ethylene diphthalic dianhydride, ethylidene diphthalic dianhydride, propylidene diphthalic dianhydride, trimethylene diphthalic dianhydride, tetramethylene diphthalic dianhydride, pentamethylene diphthalic dianhydride, hexafluoropropylidene diphthalic dianhydride, oxydiphthalic dianhydride, thiodiphthalic dianhydride, sulfonyl diphthalic dianhydride, bis(dicarboxyphenyl)tetramethyl siloxane dianhydride, bis(dicarboxyphenoxy)benzene dianhydride, bis[(dicarboxyphenyl)propyl]benzene dianhydride, bis[(dicarboxyphenoxy)phenyl]methane dianhydride, bis[(dicarboxyphenoxy)phenyl]propane dianhydride, bis[(dicarboxyphenoxy)phenyl]hexafluoropropane dianhydride, bis(dicarboxyphenoxy)dimethylsilane dianhydride, bis(dicarboxyphenyl)tetramethyldisiloxane dianhydride, naphthalene tetracarboxylic dianhydride, perylene tetracarboxylic dianhydride, pyrene tetracarboxylic dianhydride, anthracene tetracarboxylic dianhydride, phenanthrene tetracarboxylic dianhydride, anthraquinone tetracarboxylic dianhydride, phenanthrenequinone tetracarboxylic dianhydride, fluorenone tetracarboxylic dianhydride, ethylene tetracarboxylic dianhydride, butane tetracarboxylic dianhydride, cyclobutane tetracarboxylic dianhydride, cyclopentane tetracarboxylic dianhydride, cyclohexane tetracarboxylic dianhydride, bicyclohexyl tetracarboxylic dianhydride, xanthene tetracarboxylic dianhydride, and bicycle[2,2,2]oct-7-ene tetracarboxylic dianhydride.

These tetracarboxylic dianhydrides may be substituted by any of the aforementioned characteristic groups.

As for the tetracarboxylic dianhydrides, especially preferable examples include 3,6-difluoropyromellitic dianhydride, 3,6-bis(trifluoromethyl)pyromellitic dianhydride, 1,4,5,8-tetrafluoronaphthalene-2,3,6,7-tetracarboxylic dianhydride, 2,3,6,7-tetrafluoronaphthalene-1,4,5,8-tetracarboxylic dianhydride, 2,2',5,5',6,6'-hexafluorobiphenyl-3,3',4,4'-tetracarboxylic dianhydride, oxy-4,4'-bis(3,5,6-trifluorophthalic)dianhydride, thio-4,4'-bis(3,5,6-trifluorophthalic)dianhydride, sulfonyl-4,4'-bis(3,5,6-trifluorophthalic)dianhydride, 2,4,5,6-tetrafluoro-1,3-phenylenedioxy-4,4'-bis(3,5,6-trifluorophthalic)dianhydride, 2,3,5,6-tetrafluoro-1,4-phenylenedioxy-4,4'-bis(3,5,6-trifluorophthalic)dianhydride, and octafluoro-4,4'-biphenylenedioxy-4,4'-bis(3,5,6-trifluorophthalic)dianhydride.

These tetracarboxylic dianhydrides described above may be used singly or in combination of two or more.

On the occasion of introducing the bivalent hetrocyclic groups shown in the aforementioned Group (b) into the $\Psi_2$s of the aforementioned general formula (5), and into the $\Psi_3$s of the aforementioned general formula (6), it is possible to employ heterocyclic diamine compounds. For example, it is possible to employ unsubstituted heterocyclic diamines such as diaminooxadiazole, diaminothiadiazole, diaminobioxadiazole, diaminobithiadiazole, diaminooxazooxazole, diaminooxazothiazole, diaminothiazolothiazole, diaminothiazolothienothiazole and diaminothiazolopyrazinothiazole; and substituted heterocyclic diamines such as diaminopyrrole, diaminopyridine, diaminopyridazine, diaminopyrimidine, diaminopyrazine, diaminotriazine, phenylene bis(aminooxadiazole), phenylene bis(aminothiadiazole), phenylene bis(aminopyrazole), diaminobenzobisoxazole, diaminobenzobisthiazole, diaminofuran, diaminothiophene, diaminobioxazole and diaminobithiazole where all of hydrogen radicals other than amino group in these heterocyclic diamines are substituted by a substituent group such as halogen group, perfluoroalkyl group, perfluoroalkoxy group, nitro group or cyano group.

Especially preferable examples of the heterocyclic diamine compounds include 2,5-diamino-11,3,4-oxadiazole, 2,5-diamino-1,3,4-thiadiazole, 3,5-diamino-1,2,4-oxadiazole, 3,5-diamino-1,2,4-thiadiazole, 5,5'-diamino-2,2'-bi-1,3,4-oxadiazole, 5,5'-diamino-2,2'-bi-1,3,4-thiadiazole, 5,5'-diamino-3,3'-bi-1,2,4-oxadiazole, 5,5'-diamino-3,3'-bi-1,2,4-thiadiazole, 2,5-diaminothiazolo[5,4-d]thiazole, 2,5-diaminothiazolo[4',5':3,2]thieno[4,5-d]thiazole, 2,6-diamino-3,4,5-trifluoropyrizine, 4,6-diamino-2,5-difluoropyrimidine, 2,6-diamino-3,5-difluoropyrazine, 2,6-diamino-4-fluorotriazine, 2,6-diamino-4-(trifluoromethyl) triazine, 2,3,5,6-tetrafluoro-1,4-phenylene-2,2'-bis(5-aminooxadiazole), 2,3,5,6-tetrafluoro-1,4-phenylene-2,2'-bis(5-aminothiadiazole), 2,4,5,6-tetrafluoro-1,3-phenylene-2,2'-bis(5-aminooxadiazole) and 2,4,5,6-tetrafluoro-1,3-phenylene-2,2'-bis(5-aminothiadiazole).

On the occasion of introducing a substituted or unsubstituted hydrocarbon group as a bivalent substituent group into the balance of $\Psi_2$s of the aforementioned general formula (5), into the balance of $\Psi_3$s of the aforementioned general formula (6), and into $\Psi_1$s of the aforementioned general formula (4), it is possible to employ the following diamine compounds.

For example, it is possible to employ phenylene diamine, diaminobiphenyl, diaminoterphenyl, diaminoquaterphenyl, diaminoquinquephenyl, diaminonaphthalene, diaminoanthracene, diaminopyrene, diaminoperylene, diaminophenanthrene, oxydianiline, thiodianiline, sulfonyl dianiline, methylene dianiline, ethylene dianiline, propylidene dianiline, hexafluoropropylidene dianiline, hexafluoropropylene dianiline, bis(aminophenoxy)benzene, bis(aminophenylthio)benzene, bis(aminophenylsulfonyl)benzene, bis[(aminophenyl)propyl]benzene, bis[(aminophenyl)hexafluoropropyl]benzene, bis(aminophenoxy)benzene, bis[(aminophenoxy)phenyl]hexafluoropropane, bis(aminophenoxy)dimethyl silane, bis(aminophenyl) tetramethyl disiloxane, diaminofluorenone, bis(aminophenyl)fluorenone, methylene diamine, ethane diamine, propane diamine, butane diamine, pentane diamine, hexane diamine, heptane diamine, octane diamine, nonane diamine, decane diamine, bis(aminopropoxy)ethane, bis(aminopropyl)tetramethyl disiloxane, diaminocyclohexane, diaminobicyclohexyl, xylene diamine, bis(aminomethyl)cyclohexane, bis(aminopropyldimethylsilyl)benzene and bis(aminopropyl)tetraphenyldisiloxane.

These diamine compounds may be substituted by any of the aforementioned characteristic groups.

As for the diamine compounds, it is especially preferable to employ tetrafluoro-1,3-phenylene diamine, tetrafluoro-1,4-phenylene diamine, octafluoro-4,4'-diaminobiphenyl, oxy-4,4'-bis(tetrafluoro)aniline, thio-4,4'-bis(tetrafluoro)aniline, sulfonyl-4,4'-bis(tetrafluoro)aniline, difluoromethylene-4,4'-bis(tetrafluoro)aniline, hexafluoro-2,2-propylidene-4,4'-bis(tetrafluoro)aniline, tetrafluoro-1,3-phenylenedioxy-4,4'-bis(tetrafluoro)aniline, octafluoro-4,4'-biphenylenedioxy-4,4'-bis(tetrafluoro)aniline.

These diamine compounds may be used singly or in combination of two or more.

As for the organic polar solvent to be employed in the reaction, it is possible to employ, for example, N,N-dimethylformamide, N,N-dimethylacetamide, N,N-diethylacetamide, N,N-dimethoxyacetamide, N-methyl-2-pyrrolidone, N-acetyl-2-pyrrolidone, N-benzyl-2-pyrrolidone, 1,3-dimethyl-2-imidazolidinone, hexamethylphosphortriamide, N-methyl-ε-caprolactam, N-acetyl-ε-caprolactam, 1,2-dimethoxyethane, 1,2-diethoxyethane, bis(2-methoxyethyl) ether, bis(2-ethoxyethyl)ether, 1,2-bis(2-methoxyethoxy) ethane, bis[2-(2-methoxyethoxy)ethyl]ether, 1-acetoxy-2-methoxyethane, 1-acetoxy-2-ethoxyethane, (2-acetoxyethyl)(2-methoxyethyl)ether, (2-acetoxyethyl)(2-ethoxyethyl)ether, methyl 3-methoxypropionate, tetrahydrofuran, 1,3-dioxane, 1,3-dioxolane, 1,4-dioxane, pyrroline, pyridine, picoline, dimethylsulfoxide, sulfolane, γ-butyrolactone, propylene carbonate, phenol, cresol, acetone, methylethyl ketone, methylisobutyl ketone; cyclohexanone and acetonylacetone.

These organic solvents may be employed singly or in combination of two or more. The temperature of the polymerization reaction may generally be in the range of −20 to 100° C., preferably in the range of −5 to 30° C. There is any particular limitation with respect to the reaction pressure, and hence the reaction can be performed satisfactorily under normal pressure. The reaction time is dependent on the kind of tetracarboxylic dianhydride and also on the kind of the solvent to be employed in the reaction. Generally, a time period of 1 to 24 hours may be sufficient for the reaction. Incidentally, when it is difficult to increase the degree of polymerization, it may be preferable to prolong the reaction time to one to ten days, or to raise the reaction temperature up to between 50° C. and 150° C.

The polyamic acid to be obtained in this case should preferably be 0.3 (dL/g) or more, more preferably in the range of 0.3 (dL/g) to 3.0 (dL/g) in inherent viscosity, as it is turned into a 0.5 wt % solution of the polyamic acid in N-methyl-2-pyrrolidone. Because, if the inherent viscosity of the polyamic acid is too low, i.e. if the polymerization degree of the polyamic acid is too low, it is difficult to obtain a polyimide resin having a sufficient heat resistance. On the other hand, if the inherent viscosity of the polyamic acid is too high, i.e. if the polymerization degree of the polyamic acid is too high, the handling of it would become difficult.

If it is desired to manufacture a film by using the heterocyclic polyimide optical materials according to the embodiments of the present invention, it is possible to employ the conventional method of manufacturing a polyimide film. For example, a solution of the aforementioned precursor (polyamic acid) is coated on a substrate such as a silicon wafer, and heated up stepwise starting from 150° C. up to 350° C. (i.e. one hour at 150° C.—one hour at 250° C.—one hour at 350° C.) in an inert gas atmosphere such as nitrogen gas or argon gas, to turn the coated film into an imide film. Subsequently, the resultant imide film is peeled away from the substrate to obtain a heterocyclic polyimide film.

Alternatively, the heterocyclic polyimide film can be manufactured by a method wherein a heat cure promoter is added to a solution of the aforementioned precursor to enable the heterocyclic polyimide film to be obtained at relatively low temperatures and in a short period of time in air atmosphere or in an inert gas atmosphere. As for the heat cure promoter, it is possible to employ, for example, 4-hydroxypyridine, 3-hydroxypyridine, 4-pyridine methanol, nicotinic-acid amide, isonicotinic-acid amide, picoline aldehydeoxime, nicotine aldehyde oxime, hydroxynicotinic acid, 2,2'-dipyridyl, 4,4'-dipyridyl, quinoline, isoquinoline, phenanthridine, imidazole, N-methyl imidazole, phthalazine, phenanthroline, benzimidazole, N-acetylglycine, hippuric acid, 3,5-dihydroxyacetophenone, pyrogallol, phloroglucinol, methyl gallate, ethyl gallate, naphthalene-1,6-diol, 3-hydroxy benzoic acid and 4-hydroxyphenyl acetate. It is possible, in this case, to manufacture the heterocyclic polyimide film by heat-treating a coated layer of the precursor solution at a temperature ranging from 150 to 250° C. for a time period ranging from about 10 minutes to 2 hours.

Further, in order to provide a polyimide film with various functions, a functional pigment such as a non-linear optical pigment may be added to a solution of a precursor (polyamic acid). When the resultant solution is coated on a substrate and heated, a heterocyclic polyimide film having a functional pigment contained therein can be manufactured. As for the non-linear optical pigment, it is possible to employ, for example, 4-[ethyl(2-hydroxyethyl)]amino-4'-nitroazobenzene, 4-(dicyanovinyl)-4'-(dimethylamino)azobenzene, 4-(diethylamino)-4'-(tricyanovinyl)azobenzene, 4-(dimethylamino)-4'-nitrostilbene, 4-(dimethylamino)-4'-(dicyanovinyl)stilbene, 4-(dimethylamino)-4'-(tricyanovinyl)stilbene, 4-methoxy-3-methyl-4'-nitrostilbene, N-(4-nitrobenzylidene)-3-(acetylamino)-4-methoxyanilinie, 3-(acetylamino)-4-(dimethylamino)nitrobenzene, 2-(cyclooctylamino)-5-nitropiperidine, N-(5-nitro-2-pyridyl)prolinol, 2-[4-(diethylamino)styryl]-5-(tricyanovinyl) thiophene, 1-[4-(diethylamino)phenyl]-4-[5-(tricyanovinyl)-2-thenyl]butadiene, 1,3-diethyl-5-[5-(durolysin-9-yl)pentadienylidene]thiobarbituric acid, 4-amino-4'-nitrodiphenyl sulfide, 4-(dimethylamino)benzaldehyde=4-nitrophenyl hydrazone, 4-(dimethylamino)benzaldehyde=5-nitro-2-pyridyl hydrazone and 4-[4-(dimethylamino)benzylidene]-2-nitrophenyl-5-oxazolone.

These non-linear optical pigments can be added to a solution of a polyimide precursor at a mixing ratio of 2 to 30% by weight, for instance.

Next, specific embodiments of optical waveguide elements according to the present invention will be explained. In any of these embodiments, it is of course possible to apply them to a buried type, ridge type or slab type optical waveguide structure.

As for the method of manufacturing an optical waveguide element by using a polymer material, the following method is generally employed. Namely, a solution of a clad material is coated on the surface of a substrate by a spin coating method or dipping method to form a layer, which is then subjected to a curing treatment as required to form a lower clad layer. On this lower clad layer thus obtained, a solution of a core material is coated in the same way by spin coating method or dipping method to form a layer, which is then subjected to a curing treatment as required to form a core layer.

Further, by using fine working techniques such as photolithography and dry etching, a desired waveguide pattern is formed in the core layer. Finally, by a spin coating method or dipping method, a solution of clad material is coated on the surface of the core layer to form a layer, which is then subjected to a curing treatment as required to form an upper clad layer. As a result of the aforementioned laminating process, an optical waveguide can be accomplished. Incidentally, the step of forming the optical waveguide pattern can be performed by using a mold-working method or a drawing method, using for example a photosensitive resin, as well as the aforementioned fine working techniques.

The polyimide optical materials according to the embodiments of the present invention can be employed for the manufacture of any of the lower clad layer, the core layer and the upper clad layer. If the refractive index can be differentiated, materials where the fundamental structure thereof is the same with each other can be employed for the manufacture of any of these components.

The optical waveguide elements to be manufactured as described above can be utilized for the manufacture of a wavelength filter such as a linear waveguide, a curved waveguide, a branched waveguide, a multiplexed waveguide, an array type waveguide element and a grating type waveguide element; and waveguide optical device such as a thermooptical switch, a variable light attenuator, bidirectional light transmitting module and an electrooptic modulator. Additionally, it is also possible to employ the aforementioned optical waveguide elements for the manufacture of an optoelectric composite wiring board where a conventional electric wiring board is provided with a light transmitting function.

Following are detailed explanations on specific examples of this invention. However, these examples should not be construed as limiting the present invention.

(1) Synthesis of Polyamic Acid and Preparation of Polyimide Precursor:

Polyamic acid was synthesized as follows by using raw materials mixed together at a predetermined mixing ratio (shown in molar equivalent) as shown in the following Table 1. First of all, a predetermined quantity of tetracarboxylic dianhydride and a predetermined quantity of diamine compound were placed in a reaction vessel (separable flask). This reaction vessel was cooled down to –5° C. to 5° C. by using a cooling medium and 100 ml of N,N-dimethylacetamide was introduced little by little into the reaction vessel in an argon gas atmosphere with stirring to obtain a solution. Subsequently, the resultant solution was further stirred at room temperature for 24 hours in an argon gas atmosphere to obtain polyamic acid aimed at.

The raw materials (tetracarboxylic dianhydrides and diamine compounds) employed in Tables 1 to 4 and the synthesis schemes thereof are as follows.

*PATA: 2,3,5,6-pyrazine tetracarboxylic dianhydride;
This PATA was synthesized according to the following scheme.

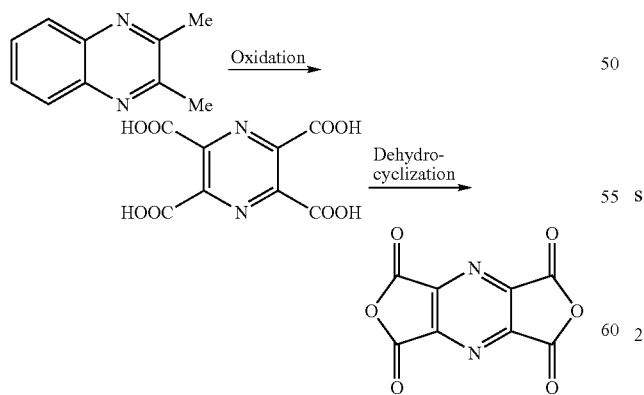

*PDTA: 3,4,5,6-pyridazine tetracarboxylic dianhydride;
This PDTA was synthesized according to the following scheme.

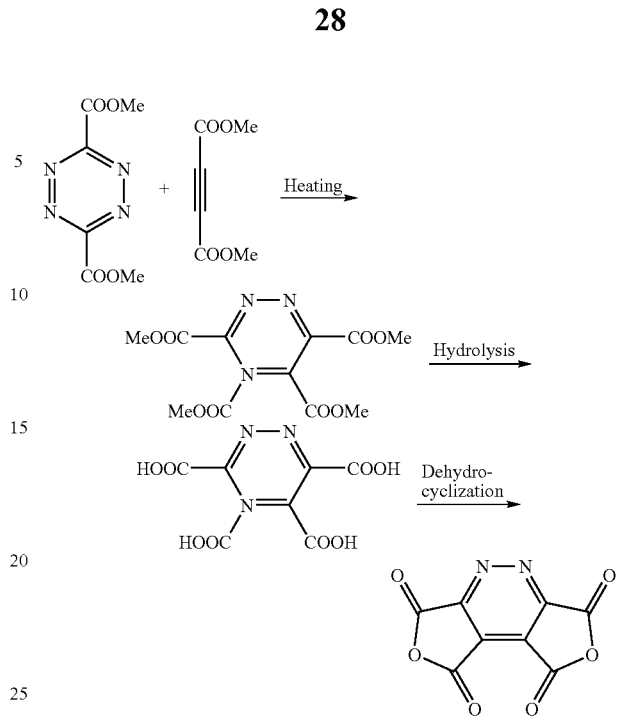

*FRTA: 2,3,4,5-furan tetracarboxylic dianhydride;
This FRTA was synthesized according to the following scheme.

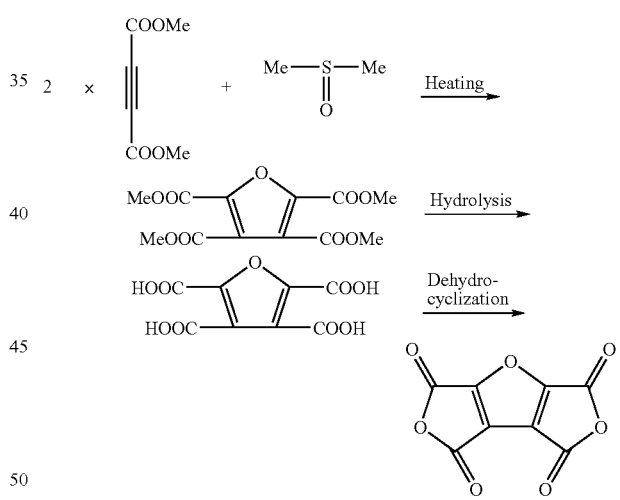

*THTA: 2,3,4,5-thiophene tetracarboxylic dianhydride;
This THTA was synthesized according to the following scheme.

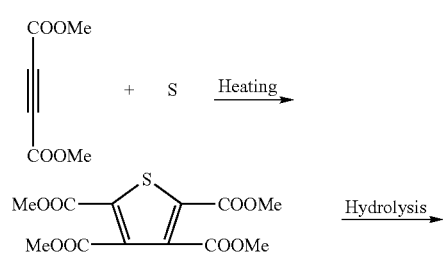

-continued

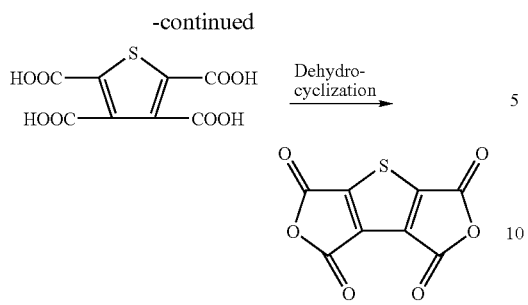

Dehydrocyclization →

*6FPMA: 3,6-bis(trifluoromethyl)pyromellitic dianhydride;

This 6FPMA was synthesized according to the following scheme.

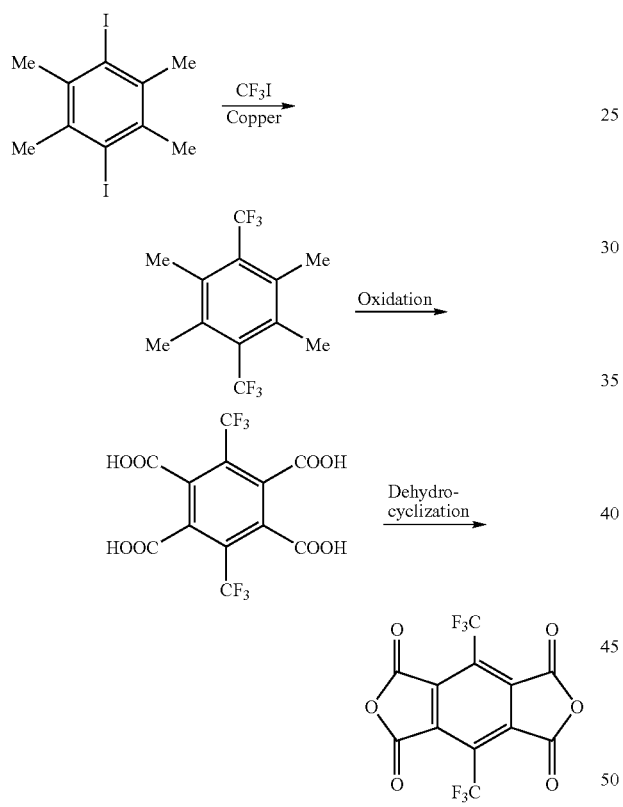

*6FBPTA: 2,2',5,5',6,6'-hexafluoro-3,3',4,4'-biphenyl tetracarboxylic dianhydride;

This 6FBPTA was synthesized according to the following scheme.

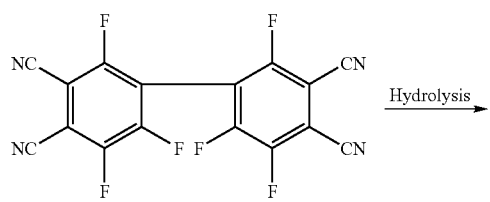

Hydrolysis →

-continued

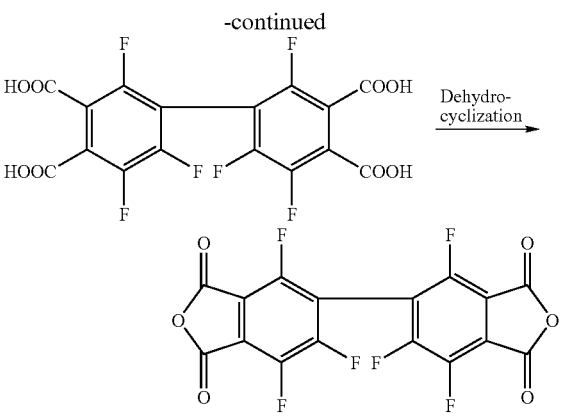

*6FOPTA: oxy-4,4'-bis(3,5,6-hexafluorophthalic) dianhydride;

This 6FOPTA was synthesized according to the following scheme.

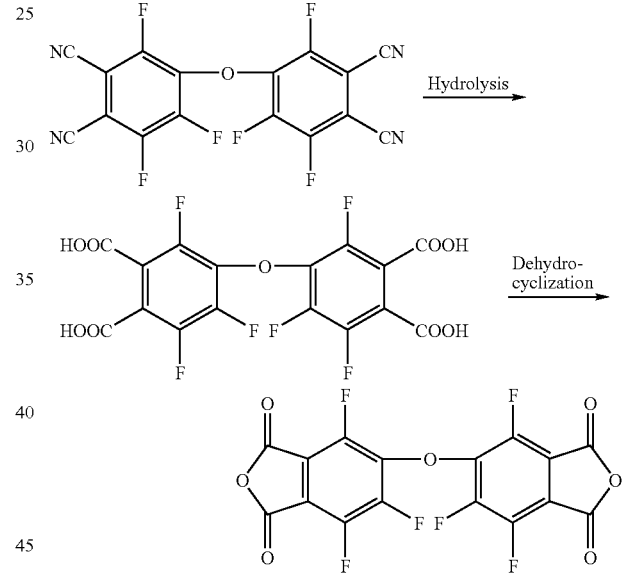

*6FPPTA: 1,1,1,3,3,3-hexafluoro-2,2-propylidene-4,4'-diphthalic dianhydride;

This 6FPPTA was obtained from the market.

*TDZDA: 2,5-diamino-1,3,4-thiadiazole; This TDZDA was synthesized according to the following scheme.

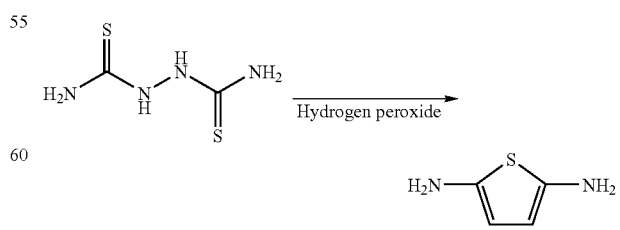

*BTDZDA: 5,5'-diamino-2,2'-bi-1,3,4-thiadiazole;

This BTDZDA was synthesized according to the following scheme.

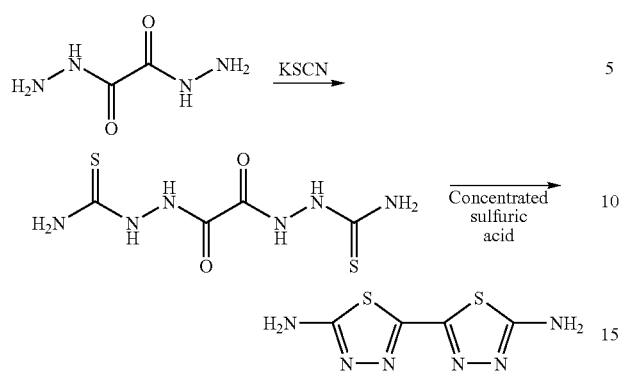

*BODZDA: 5,5'-diamino-3,3'-bi-1,2,4-oxadiazole;

This BODZDA was synthesized according to the following scheme.

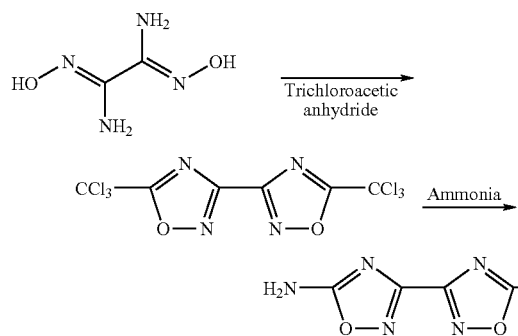

*3FTAZDA: 2,4-diamino-6-trifluoromethyl-1,3,5-triazole;

This 3FTAZDA was synthesized according to the following scheme.

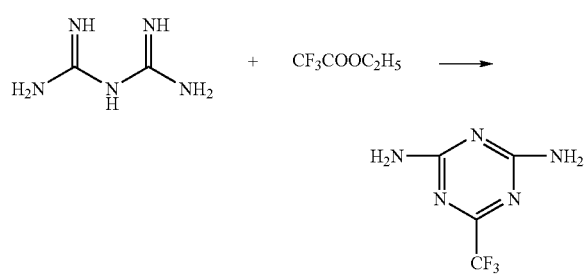

*4FmPDA: 2,4,5,6-tetrafluoro-1,3-phenylene diamine;

The product obtained from the market was refined.

8FBPDA: 2,2',3,3',5,5',6,6'-octafluoro-4,4'-biphenyl diamine;

This 8FBPDA was obtained from the market.

8FODA: oxy-4,4'-bis(2,3,5,6-tetrafluoroaniline);

This 8FODA was synthesized according to the following scheme.

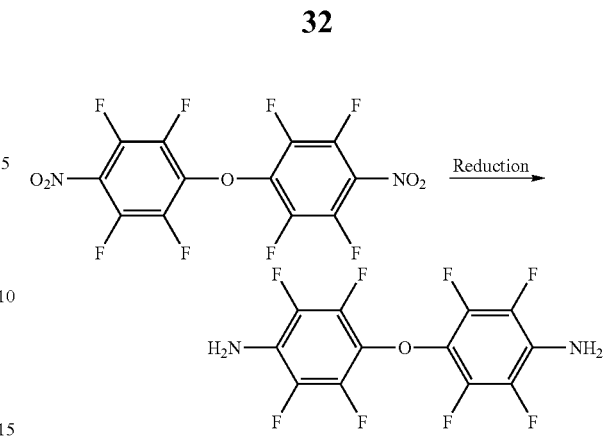

*6FBPDA: 2,2'-bis(trifluoromethyl)biphenyl-4,4'-diamine;

This 6FBPDA was obtained from the market.

*12FmAPB: 1,3-bis(4-amino-2,3,5,6-tetrafluorophenoxy)-2,4,5,6-tetrafluorobenzene;

This 12FmAPB was synthesized according to the following scheme.

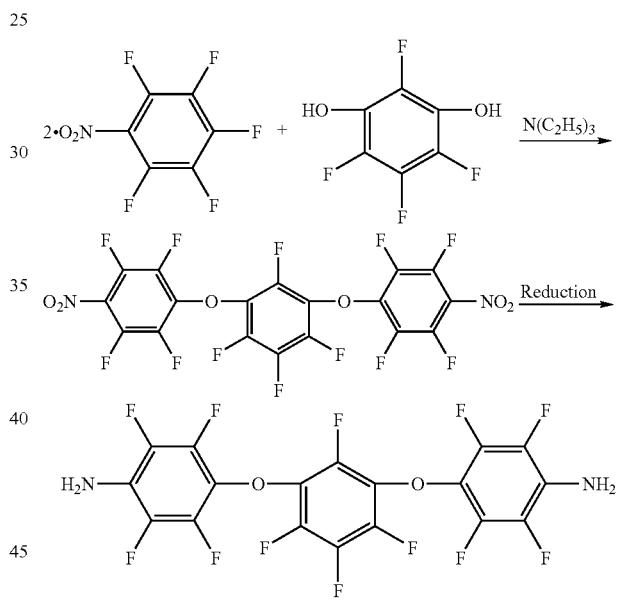

*12FpAPB: 1,4-bis(4-amino-2,3,5,6-tetrafluorophenoxy)-2,3,5,6-tetrafluorobenzene;

This 12FpAPB was synthesized according to the following scheme.

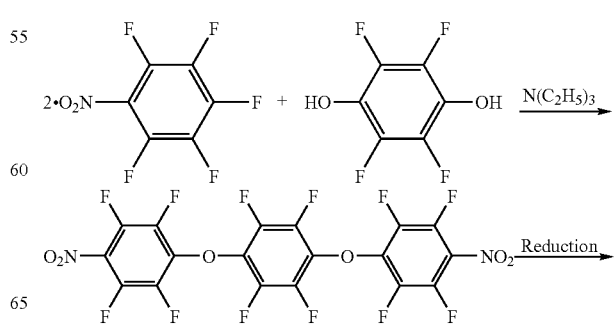

-continued

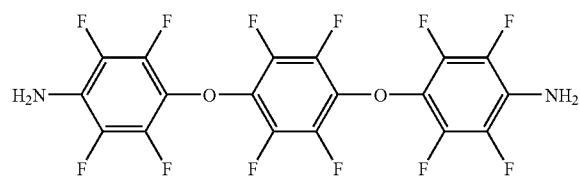

The intrinsic viscosity of a 0.5 wt % N-methyl pyrrolidone solution of each of polyamic acids synthesized as described above was measured at a temperature of 30° C., the results being shown, together with the raw materials employed, in the following Tables 1 to 5.

TABLE 1

|  | Example 1 | Example 2 | Example 3 | Example 4 | Example 5 |
|---|---|---|---|---|---|
| PATA | 1.0 | 1.0 | 1.0 | — | — |
| PDTA | — | — | — | 1.0 | — |
| FRTA | — | — | — | — | 1.0 |
| THTA | — | — | — | — | — |
| 6FPMA | — | — | — | — | — |
| 6FBPTA | — | — | — | — | — |
| 6FOPTA | — | — | — | — | — |
| 6FPPTA | — | — | — | — | — |
| TDZDA | — | — | — | — | — |
| BTDZDA | — | — | — | — | — |
| BODZDA | — | — | — | — | — |
| 3FTAZDA | — | — | — | — | — |
| 4FmPDA | 1.0 | — | — | 1.0 | 1.0 |
| 8FBPDA | — | 1.0 | — | — | — |
| 8FODA | — | — | 1.0 | — | — |
| 6FBPDA | — | — | — | — | — |
| 12FmAPB | — | — | — | — | — |
| 12FpAPB | — | — | — | — | — |
| Concentration (wt %) | 20.0 | 20.0 | 20.0 | 20.0 | 20.0 |
| Inherent viscosity (dL/g) | 0.50 | 0.42 | 0.45 | 0.42 | 0.53 |

TABLE 2

|  | Example 6 | Example 7 | Example 8 | Example 9 | Example 10 |
|---|---|---|---|---|---|
| PATA | — | — | — | — | — |
| PDTA | — | — | — | — | — |
| FRTA | — | — | — | — | — |
| THTA | 1.0 | 1.0 | 0.5 | — | — |
| 6FPMA | — | — | — | 1.0 | — |
| 6FBPTA | — | — | 0.5 | — | 1.0 |
| 6FOPTA | — | — | — | — | — |
| 6FPPTA | — | — | — | — | — |
| TDZDA | — | — | — | 1.0 | 1.0 |
| BTDZDA | — | — | — | — | — |
| BODZDA | — | — | — | — | — |
| 3FTAZDA | — | — | — | — | — |
| 4FmPDA | 1.0 | — | 1.0 | — | — |
| 8FBPDA | — | 1.0 | — | — | — |
| 8FODA | — | — | — | — | — |
| 6FBPDA | — | — | — | — | — |
| 12FmAPB | — | — | — | — | — |
| 12FpAPB | — | — | — | — | — |
| Concentration (wt %) | 20.0 | 20.0 | 20.0 | 20.0 | 20.0 |
| Inherent viscosity (dL/g) | 0.55 | 0.48 | 0.50 | 0.40 | 0.51 |

TABLE 3

|  | Example 11 | Example 12 | Example 13 | Example 14 | Example 15 |
|---|---|---|---|---|---|
| PATA | — | — | — | — | — |
| PDTA | — | — | — | — | — |
| FRTA | — | — | — | — | — |
| THTA | — | — | — | — | — |
| 6FPMA | — | 1.0 | — | — | — |
| 6FBPTA | — | — | 1.0 | — | 1.0 |
| 6FOPTA | 1.0 | — | — | 1.0 | — |
| 6FPPTA | — | — | — | — | — |
| TDZDA | 1.0 | — | — | — | — |
| BTDZDA | — | 1.0 | 1.0 | 1.0 | — |
| BODZDA | — | — | — | — | 1.0 |
| 3FTAZDA | — | — | — | — | — |
| 4FmPDA | — | — | — | — | — |
| 8FBPDA | — | — | — | — | — |
| 8FODA | — | — | — | — | — |
| 6FBPDA | — | — | — | — | — |
| 12FmAPB | — | — | — | — | — |
| 12FpAPB | — | — | — | — | — |
| Concentration (wt %) | 20.0 | 20.0 | 20.0 | 20.0 | 20.0 |
| Inherent viscosity (dL/g) | 0.47 | 0.44 | 0.53 | 0.49 | 0.42 |

TABLE 4

|  | Example 16 | Example 17 | Example 18 | Example 19 | Example 20 |
|---|---|---|---|---|---|
| PATA | — | — | 0.5 | 1.0 | 1.0 |
| PDTA | — | — | — | — | — |
| FRTA | — | — | — | — | — |
| THTA | — | 0.5 | — | — | — |
| 6FPMA | — | — | 0.5 | — | — |
| 6FBPTA | 1.0 | 0.5 | — | — | — |
| 6FOPTA | — | — | — | — | — |
| 6FPPTA | — | — | — | — | — |
| TDZDA | — | — | 0.5 | — | — |
| BTDZDA | 0.5 | 0.5 | — | — | — |
| BODZDA | — | — | — | — | — |
| 3FTAZDA | 0.5 | — | — | — | — |
| 4FmPDA | — | 0.5 | 0.5 | — | — |
| 8FBPDA | — | — | — | — | — |
| 8FODA | — | — | — | — | — |
| 6FBPDA | — | — | — | — | — |
| 12FmAPB | — | — | — | 1.0 | — |
| 12FpAPB | — | — | — | — | 1.0 |
| Concentration (wt %) | 20.0 | 20.0 | 20.0 | 20.0 | 20.0 |
| Inherent viscosity (dL/g) | 0.38 | 0.53 | 0.45 | 0.45 | 0.50 |

TABLE 5

|  | Example 21 | Example 22 | Comparative example 1 | Comparative example 2 |
|---|---|---|---|---|
| PATA | — | — | — | — |
| PDTA | — | — | — | — |
| FRTA | — | — | — | — |
| THTA | 1.0 | 1.0 | — | — |
| 6FPMA | — | — | 1.0 | — |
| 6FBPTA | — | — | — | — |
| 6FOPTA | — | — | — | — |
| 6FPPTA | — | — | — | 1.0 |
| TDZDA | — | — | — | — |
| BTDZDA | — | — | — | — |
| BODZDA | — | — | — | — |
| 3FTAZDA | — | — | — | — |
| 4FmPDA | — | — | 1.0 | — |

TABLE 5-continued

|  | Example 21 | Example 22 | Comparative example 1 | Comparative example 2 |
|---|---|---|---|---|
| 8FBPDA | — | — | — | — |
| 8FODA | — | — | — | — |
| 6FBPDA | — | — | — | 1.0 |
| 12FmAPB | 1.0 | — | — | — |
| 12FpAPB | — | 1.0 | — | — |
| Concentration (wt %) | 20.0 | 20.0 | 20.0 | 20.0 |
| Inherent viscosity (dL/g) | 0.50 | 0.53 | 0.38 | 0.65 |

Among the polyamic acids obtained in Examples 1 to 22, those having a repeating unit represented by the aforementioned general formula (4) were polyamic acids obtained in Examples 1 to 8 and in Examples 19 to 22; those having a repeating unit represented by the aforementioned general formula (5) were polyamic acids obtained in Examples 9 to 16; and those having a repeating unit represented by the aforementioned general formula (6) were polyamic acids obtained in Examples 17 and 18.

The polyamic acid obtained in Comparative Example 1 was a precursor of full fluorinated polyimide wherein all of hydrogen radicals in the molecule were substituted by fluorine and hence fluorine radicals were excessively introduced into the precursor. On the other hand, the polyamic acid obtained in Comparative Example 2 was a precursor of partially fluorinated polyimide, so it included a hydrogen radical (C—H group) in its molecule even in a state of polyimide after the heat cure thereof.

(2) Preparation of Polyimide Film and the Measurement of the Physical Properties of the Polyimide Film:

By using a solution of each of the polyimide precursors (polyamic acids) obtained in Example 1 and Comparative Example 2, polyimide films were prepared for using them for measuring the light absorption spectrum thereof. Specifically, first of all, a solution of each of the polyimide precursors was coated on the surface of a silicon wafer 4 inches in diameter by a spin-coating method, and then the coated layer was heated up stepwise from room temperature in a drying oven filled with nitrogen gas. More specifically, each of the coated layers was heated for one hour at 150° C., for one hour at 250° C. and for one hour at 350° C. After being allowed to air-cool, the polyimide films were peeled away from the silicon wafer to obtain polyimide films for using them for measuring the light absorption spectrum thereof. After being allowed to dry in vacuum for two hours at a temperature of 100° C., these polyimide films were measured with regard to the light absorption spectrum thereof in the range of 0.6 to 1.7 µm in wavelength.

The results of the measurement on the light absorption spectrum of each of polyimide films are shown in the graph of FIG. 1. In FIG. 1, the curves "a" and "b" illustrate the results of the measurement of the polyimide films of Example 1 and Comparative Example 1, respectively. Incidentally, in the graph of FIG. 1, the abscissa represents the wavelength (µm) and the ordinate represents the light absorbency (arbitrary unit).

It is clearly demonstrated by the curve "a" that the polyimide film of Example 1 was incapable of absorbing light in the wavelength range of 1.0 to 1.6 µm. Whereas, as shown in the curve "b", the partially fluorinated polyimide of Comparative Example 2 was capable of absorbing the light of this wavelength zone. It was confirmed from these results that the polyimide films according to Examples of the present invention were excellent in light transparency in the wavelength zone of optical communications.

Next, polyimide films for using them for measuring the thermogravimetric analysis/differential thermal analysis (TG/DTA), thermomechanical analysis (TMA), water absorption and solvent resistance thereof were manufactured according to the following procedure. Specifically, first of all, a solution of each of the polyimide precursors was coated on the surface of a glass plate having a size of: 1 mm×130 mm×150 mm by using a bar coater having a thickness of 75 µm, and then the coated layer was heated for one hour at a temperature of 110° C. The polyamic acid film thus obtained was peeled away from the glass substrate and secured to a brass frame having an inner frame dimension of: 100 mm×100 mm. The resultant structure was heated up stepwise from room temperature in a drying oven filled with nitrogen gas. More specifically, each of the coated layers was heated for one hour at 150° C., for one hour at 250° C. and for one hour at 350° C. to obtain polyimide films.

According to the following methods, these polyimide films thus manufactured were measured with regard to the decomposition temperature, glass transition temperature (Tg), moisture absorption and solvent resistance thereof.

Namely, the decomposition temperature (5 wt % weight reduction temperature) of the polyimide films

TABLE 6

|  | Ratio of fluorination (wt %) | Transparency 1.0–1.6 µm | Decomposition temp. (° C.) | Glass transition temp. (° C.) | Moisture absorbency (%) | Solvent resistance |
|---|---|---|---|---|---|---|
| Example 1 | 20.9 | Not absorbed | 530 | 330 | 0.4 | Not dissolved/not changed |
| Example 2 | 29.7 | Not absorbed | 520 | 340 | 0.4 | Not dissolved/not changed |
| Example 3 | 28.8 | Not absorbed | 520 | 300 | 0.5 | Not dissolved/not changed |
| Example 4 | 20.9 | Not absorbed | 510 | 315 | 0.4 | Not dissolved/not changed |
| Example 5 | 21.6 | Not absorbed | 535 | 330 | 0.3 | Not dissolved/not changed |
| Example 6 | 20.7 | Not absorbed | 540 | 335 | 0.3 | Not dissolved/not changed |
| Example 7 | 29.5 | Not absorbed | 535 | 340 | 0.3 | Not dissolved/not changed |
| Example 8 | 29.1 | Not absorbed | 530 | 310 | 0.3 | Not dissolved/not changed |
| Example 9 | 26.3 | Not absorbed | 510 | 310 | 0.4 | Not dissolved/not changed |
| Example 10 | 23.7 | Not absorbed | 525 | 320 | 0.4 | Not dissolved/not changed |
| Example 11 | 22.9 | Not absorbed | 520 | 300 | 0.5 | Not dissolved/not changed |
| Example 12 | 22.0 | Not absorbed | 510 | 315 | 0.4 | Not dissolved/not changed |
| Example 13 | 20.1 | Not absorbed | 530 | 320 | 0.4 | Not dissolved/not changed |
| Example 14 | 19.6 | Not absorbed | 525 | 305 | 0.5 | Not dissolved/not changed |
| Example 15 | 21.3 | Not absorbed | 530 | 320 | 0.4 | Not dissolved/not changed |

TABLE 6-continued

|  | Ratio of fluorination (wt %) | Transparency 1.0–1.6 μm | Decomposition temp. (° C.) | Glass transition temp. (° C.) | Moisture absorbency (%) | Solvent resistance |
|---|---|---|---|---|---|---|
| Example 16 | 25.7 | Not absorbed | 515 | 310 | 0.3 | Not dissolved/not changed |
| Example 17 | 20.3 | Not absorbed | 530 | 310 | 0.3 | Not dissolved/not changed |
| Example 18 | 23.8 | Not absorbed | 525 | 305 | 0.3 | Not dissolved/not changed |
| Example 19 | 32.9 | Not absorbed | 510 | 300 | 0.3 | Not dissolved/not changed |
| Example 20 | 32.9 | Not absorbed | 515 | 305 | 0.3 | Not dissolved/not changed |
| Example 21 | 32.7 | Not absorbed | 520 | 300 | 0.3 | Not dissolved/not changed |
| Example 22 | 32.7 | Not absorbed | 525 | 305 | 0.3 | Not dissolved/not changed |
| Comparative example 1 | 38.2 | Not absorbed | 490 | 220 | 0.3 | Dissolved |
| Comparative example 2 | 31.1 | Absorbed | 530 | 335 | 0.4 | Swelled | was measured in a nitrogen gas stream by TG/DTA. The glass transition temperature (Tg) of the polyimide films was measured by TMA. The moisture absorption of the polyimide films was measured in such a manner that the polyimide films were left to stand for one week in an atmosphere of saturated water vapor at a temperature of 20° C. and then, the water collected on the surfaces of the films was wiped away and measured by tube oven-attached Karl Fischer water content titrating method. Further, the solvent resistance of the polyimide films was measured in such a manner that a piece of the polyimide film having a size of: 10 mm×30 mm is placed in a flask, into which 50 mL of N,N-dimethylacetoamide (DMAC) is introduced and stirred for one hour at a temperature of 30° C. to visually observe any changes in the configuration of the polyimide film.

The results obtained are shown in the following Table 6 together with the rate of fluorination and optical transparency of each of these polyimide films.

As shown in Table 6, the polyimide films according to these Examples of the present invention (Examples 1 to 22) were found excellent in all of the properties including the decomposition temperature, glass transition temperature (Tg), moisture absorption and solvent resistance.

Specifically, the polyimide films of Examples 1 to 22 were all found as having a very high decomposition temperature ranging from 510° C. to 540° C., which is comparative to that of the fluorinated polyimides of Comparative Examples 1 and 2, thus confirming the excellent heat decomposition resistance of these polyimide films of Examples 1 to 22. Further, the glass transition temperature of the polyimide films of Examples 1 to 22 were all found as having a very high glass transition temperature ranging from 300° C. to 340° C., which is higher than that of the full fluorinated polyimide of Comparative Example 1 and comparable to that of the partially fluorinated polyimide of Comparative Example 2, thus confirming the excellent heat resistance of these polyimide films of Examples 1 to 22.

With respect to the moisture absorption, the polyimide films of Examples 1 to 22 were all found very low in moisture absorption, i.e. within the range of 0.3 to 0.5%, which is comparable to that of the fluorinated polyimides of Comparative Examples 1 and 2, thus confirming the excellent anti-moisture absorption property of these polyimide films of Examples 1 to 22.

Moreover, the polyimide films of Examples 1 to 22 indicated little changes in configuration as a result of the aforementioned solvent resistance test. Whereas, the full fluorinated polyimide of Comparative Example 1 was found completely dissolved in the DMAC, and the partially fluorinated polyimide of Comparative Example 2 was found swelled in the DMAC. In view of these facts, the polyimide films of Examples 1 to 22 were excellent in solvent resistance, thus confirming the excellent solvent resistance of the heterocyclic polyimides of these examples of the present invention.

Next, by using the heterocyclic polyimide precursors according to the examples of the present invention, various kinds of optical waveguide elements were manufactured.

EXAMPLE 23

Figure 2:
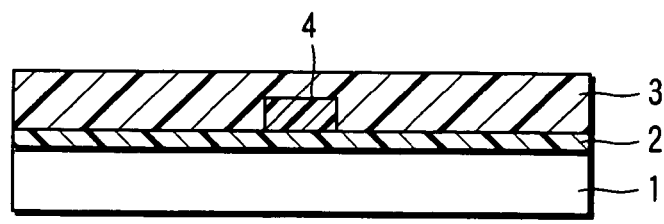
FIG. 2 is a cross-sectional view illustrating the structure of a buried type optical waveguide manufactured in one example.

FIG. 2 shows a cross-sectional view illustrating the structure of a buried type optical waveguide manufactured in this example. In this buried type optical waveguide shown in FIG. 2, a lower clad layer 2 and an upper clad layer 3 were successively laminated on the surface of a silicon wafer employed as a substrate 1. In this structure, a core 4 is buried in the upper clad layer 3.

The lower clad layer 2, the upper clad layer 3 and the core 4 were all formed by using polyamic acid varnish which was prepared in advance in such a manner that to a solution comprising, as a fundamental constituent compound, the heterocyclic polyimide precursor prepared in the aforementioned Example 6, 4-hydroxypyridine was added as a heat cure promoter at a ratio of 10% by weight based on the solid matter in the solution to obtain the varnish. The heterocyclic polyimide precursor for forming each of the aforementioned components was respectively synthesized by changing the composition of raw material so as to enable the refractive index of the polyimide film after curing to fall within a desired range.

First of all, a solution of the heterocyclic polyimide precursor for forming the lower clad layer was coated on the surface of the silicon wafer 1 by spin coating and heated for about 30 minutes at a temperature of 200° C. to form the lower clad layer 2 having a thickness of about 5 μm. On this lower clad layer 2, a solution of the heterocyclic polyimide precursor for forming the core layer was coated in the same manner as described above and heated for about 30 minutes at a temperature of 200° C. to form a polyimide layer having a thickness of 8 μm. By photolithography and dry etching, the polyimide layer was patterned to form the core layer 4 having a width of 8 μm.

A solution of the heterocyclic polyimide precursor for forming the upper clad layer was coated all over the lower clad layer 2 and the core layer 4 in the same manner as described above and heated for about 30 minutes at a temperature of 200° C. to form an upper clad layer 3 having a thickness of about 5 μm.

As a result of the aforementioned process, a buried type channel waveguide having a size of: 8 μm (in width)×8 μm (in height) was formed as shown in FIG. 2.

The buried type optical waveguide thus obtained was cut out by dicing and the optical characteristics thereof were evaluated. As a result of the evaluation of the light transmission loss of the optical waveguide by cutback method, the light transmission loss was found to be 0.2 dB/cm for TM polarized wave and 0.16 dB/cm for TE polarized wave.

When the buried type optical waveguide was baked in a dry atmosphere at a temperature of 200° C. to investigate the heat resistance thereof, the characteristics of the optical waveguide were not fluctuated even after the baking of 500 hours. Further, when a pressure cooker test (120° C., 100% RT and 2 atm.) was performed as a life test, the fluctuation in characteristics of the optical waveguide was not recognized at all.

EXAMPLE 24

Figure 3:
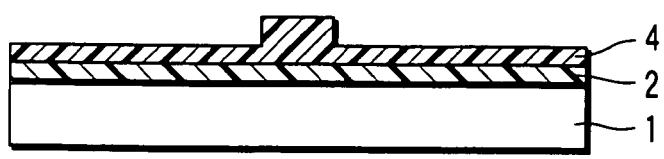
FIG. 3 is a cross-sectional view illustrating the structure of a ridge type optical waveguide manufactured in one example.

FIG. 3 shows a cross-sectional view illustrating the structure of a ridge type optical waveguide manufactured in this example. In this ridge type optical waveguide shown in FIG. 3, a lower clad layer 2 and a core layer 4 were successively deposited on the surface of a silicon wafer employed as a substrate 1.

The lower clad layer 2 and the core 4 were all formed by using a solution which was prepared in the same manner as that of aforementioned Example 23.

First of all, a solution of the heterocyclic polyimide precursor for forming the lower clad layer was coated on the surface of the silicon wafer 1 by spin coating and heated for about 30 minutes at a temperature of 200° C. to form the lower clad layer 2 having a thickness of about 5 μm. On this lower clad layer 2, a solution of the heterocyclic polyimide precursor for forming the core layer was coated in the same manner as described above and heated for about 30 minutes at a temperature of 200° C. to form a polyimide layer having a thickness of 5 μm. By photolithography and dry etching, the polyimide layer was patterned to form the core layer 4 having a width of 8 μm.

As a result of the aforementioned-process, a ridge type channel waveguide having a size of: 8 μm (in width)×5 μm (in height) was formed as shown in FIG. 3.

The ridge type optical waveguide thus obtained was cut out by dicing and the optical characteristics thereof were evaluated. As a result of the evaluation of the light transmission loss of the optical waveguide by cutback method, the light transmission loss was found 0.3 dB/cm for TM polarized wave and 0.28 dB/cm for TE polarized wave.

When this ridge type optical waveguide was baked in a dry atmosphere at a temperature of 200° C. to investigate the heat resistance thereof, the characteristics of the optical waveguide were not fluctuated even after the baking of 500 hours. Further, when a pressure cooker test (120° C., 100% RT and 2 atm.) was performed as a life test, the fluctuation in characteristics of the optical waveguide was not recognized at all.

EXAMPLE 25

Figure 4:
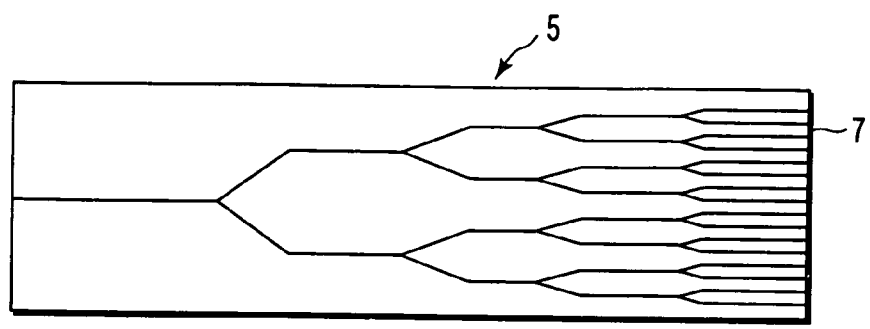
FIG. 4 is a plan view illustrating the structure of a star coupler manufactured in one example.

FIG. 4 shows a plan view illustrating the structure of a star coupler manufactured in this example.

An optical waveguide layer 5 was manufactured by using the technique of buried type waveguide structure and by the same way as that described in Example 23 using a solution of the heterocyclic polyimide precursor which was prepared in the same manner as described in Example 23. The star coupler shown in FIG. 4 is a 1×16 star coupler which enables the equipartition of optical signals to be realized.

When a beam of light having a wavelength of 1.55 μm was irradiated from an incidence port 6, it was possible to detect optical signals having an intensity of about 1/16 from all of outgoing ports 7.

EXAMPLE 26

Figure 5:
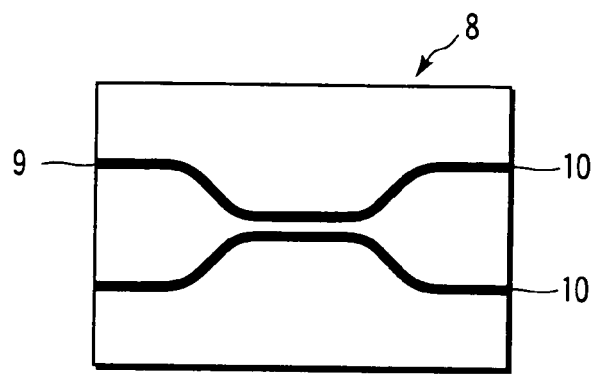
FIG. 5 is a schematic view illustrating the structure of a directional coupler manufactured in one example.

FIG. 5 shows a schematic view illustrating the structure of a directional coupler manufactured in this example.

An optical waveguide layer 8 was manufactured by using a buried type waveguide structure and by the same way as that described in Example 23 using a solution of the heterocyclic polyimide precursor which was prepared in the same manner as described in Example 23.

As an optical fiber was coupled with an input port 9 of the directional coupler obtained in this example, it was possible to enable an output port 10 to have an output of light. When the wavelength of beam to be irradiated is 1.55 μm, the coupling ratio of TM polarized wave and TE polarized wave was 97% or more. Further, on this occasion, the insertion loss including the coupling loss was 2 dB, and the excessive loss of 3 dB coupler was 0.2 dB, thus both indicating excellent characteristics.

Further, the directional coupler according to this example was heat-treated for 100 hours at a temperature of 100° C. and then, left to stand in an atmosphere of high temperature and high humidity (85° C., 85 RH). Even after the exposure to such severe conditions, the directional coupler was confirmed as capable of maintaining the same degree of performance as the initial performance thereof and of exhibiting stable properties.

EXAMPLE 27

Figure 6:
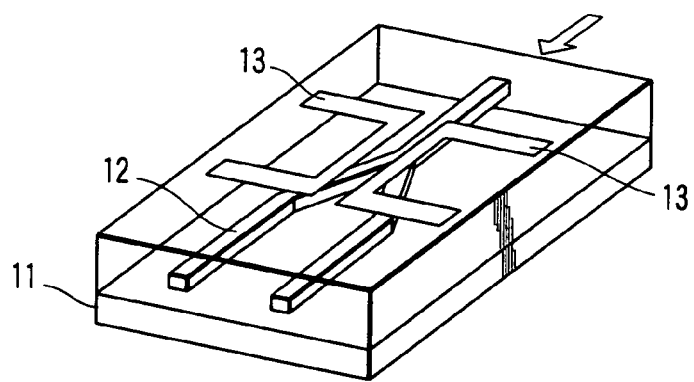
FIG. 6 is a perspective view illustrating the structure of a thermooptical switch manufactured in one example.

FIG. 6 shows a perspective view illustrating the structure of a thermooptical switch manufactured in this example. In this thermooptical switch shown in FIG. 6, an optical waveguide layer 12 and heater electrodes 13 were formed on the surface of a substrate 11.

The optical waveguide layer 12 was formed by using a solution which was prepared in the same manner as that of aforementioned Example 23. The size of the core was set to 8 μm×8 μm, and the planar structure of branched paths was formed of a Y-shaped structure where the branch angle thereof was set to 0.1 degree. On the surface of the upper clad layer, Ti was deposited to a thickness of 50 nm, and then, Pt was deposited to a thickness of 200 nm, both by vacuum deposition. The resultant layers were patterned by photolithography and ion milling, thereby forming thin film heater electrodes 13.

As a result of the aforementioned process, a digital type 1×2 thermooptical light switch was formed as shown in FIG. 6. The thermooptical light switch thus manufactured was cut out by dicing to form a chip-like switch for evaluating the optical properties thereof.

When a beam of light having a wavelength of 1.55 μm was introduced, through an optical fiber, into this manufactured thermooptical light switch under the condition where electric current is not transmitted to any of the heater electrodes 13, both of the output ports were enabled to have an output of a half of the light, respectively. On the other hand, when electric current, i.e. an electric power of about 100 mW, is transmitted to only one of the heater electrodes, only one of the output ports which was not lightened was permitted to have an output of the light, thus confirming the switching. On this occasion, the quenching ratio was 20 dB and the switching velocity was 10 msec.

Even when the operation of alternately applying an electric power of 100 mW to the heaters was repeated $10^4$ times, there was not recognized any substantial change in durability of the heaters.

EXAMPLE 28

Figure 7:
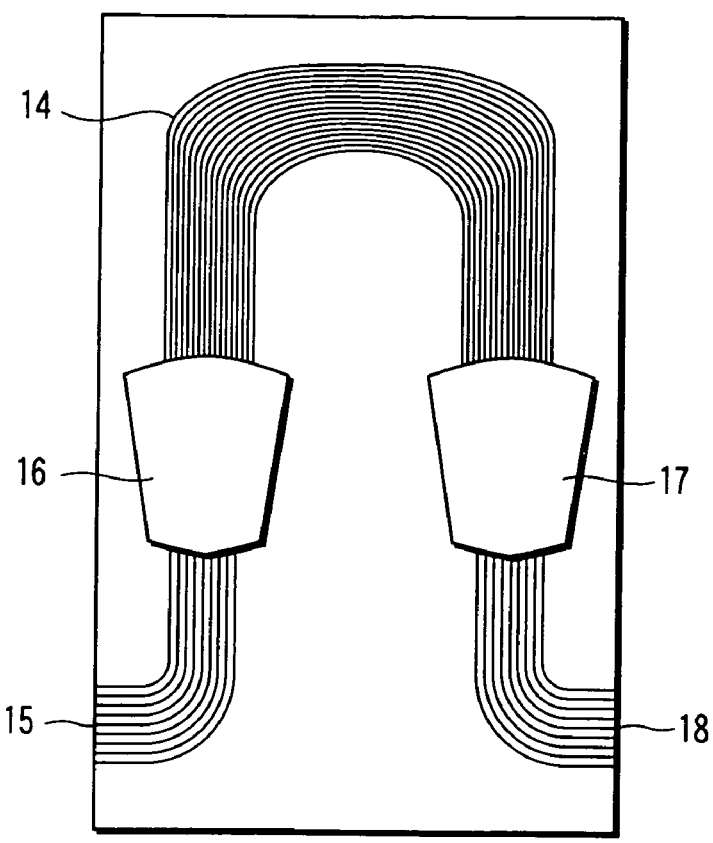
FIG. 7 is a schematic view illustrating the structure of an arrayed waveguide type optical multi-/demultiplexer manufactured in one example.

FIG. 7 shows a schematic view illustrating the structure of an arrayed waveguide type optical multi-/demultiplexer manufactured in this example. This arrayed waveguide type optical multi-/demultiplexer shown in FIG. 7 was manufactured by using the technique of buried type waveguide structure and by the same way as that described in Example 23 using a solution of the heterocyclic polyimide precursor which was prepared in the same manner as described in Example 23.

In this arrayed waveguide type optical multi-/demultiplexer, wavelength multiple signals having wavelengths of $\lambda_1, \lambda_2 \ldots \lambda_8$ which have been introduced therein from an input port 15 are permitted to spatially expand by an input slab 16 functioning as a lens and then, coupled onto an arrayed waveguide 14. Since this arrayed waveguide 14 is provided with the function of grating, eight signals are enabled to diffract in different directions depending on differences in wavelength. At an output slab 17, the signal lights that have been diffracted in accordance with the differences in wavelength are permitted to reconverge, thereby allowing them to couple with eight output waveguides to guide them to an output ports 18.

To this optical multi-/demultiplexer, light signals having wavelengths ranging from 1545 nm to 1565 nm were input to evaluate the demultiplexing property of the optical multi-/demultiplexer. As a result, the intervals of among wavelengths were found 1.6 nm, the loss was found to be 7 dB and the cross talk was found to be 20 dB. When the reliability of characteristics of the optical multi-/demultiplexer was tested in the same manner as described in the aforementioned Example 22, any fluctuation of the characteristics thereof was not recognized.

EXAMPLE 29

Figure 8:
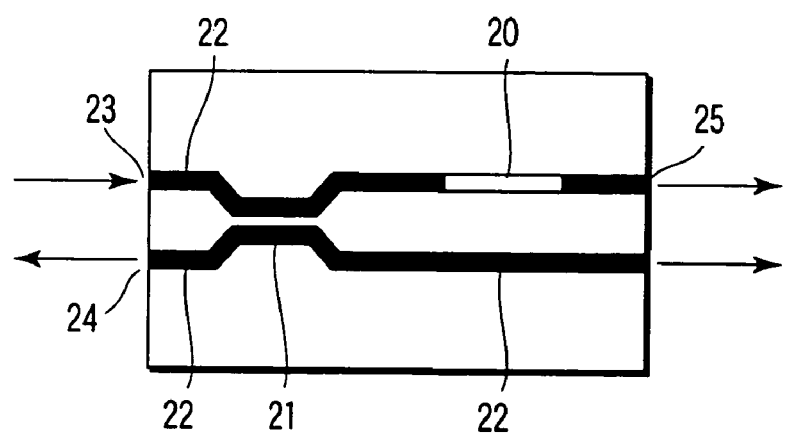
FIG. 8 is a plan view illustrating the structure of a grating type wave filter manufactured in one example.

FIG. 8 shows a plan view illustrating the structure of a grating type wave filter manufactured in this example. This grating type wave filter was manufactured by using a solution of the heterocyclic polyimide precursor prepared in the same manner as described in Example 23 and by the same procedure as that described in Example 23, thereby fabricating a buried type waveguide structure on the surface of a metal substrate (not shown). The size in cross-section of the core was set to 8 $\mu$m×8 $\mu$m, and the waveguide patterns 21 and 22 were constructed such that a directional coupler having a coupling ratio of 50% is connected with a linear waveguide. In this linear waveguide portion, a refractive index grating $2\times10^{-3}$ in difference of refractive index, 0.43 $\mu$m in period and 2 mm in length was written to obtain the wavelength filter.

A light beam of from an LED light source of 1.31 $\mu$m zone was entered through an optical fiber into the input port 23 of the variable wavelength filter, and the characteristics of wavelength that had been output from a drop port 24 was measured by using a spectral analyzer. The transmission characteristics to the drop port 24 under the condition where the temperature of the substrate was 25° C. were 1320 nm in central wavelength, 0.5 nm in bandwidth, 9 dB in insertion loss and 18 dB in quenching ratio. When the temperature of the substrate was raised to 80° C., the central wavelength became 1310 nm, thus confirming the fact that the grating type wavelength filter of this example was capable of actuating as a variable wavelength filter.

EXAMPLE 30

FIG. 9 shows a perspective view illustrating the structure of a bidirectional light transmitting module manufactured in this example. In this bidirectional light transmitting module shown in FIG. 9, an electric wiring layer 28 and an optical waveguide layer 34 are formed on the surface of a substrate 27.

On the surface of this optical waveguide layer 34, there are disposed a laser diode 29 for transmitting a light beam having a wavelength of 1.3 $\mu$m, and a photodiode 30 for monitoring the output of light. By using these optical semiconductor elements, a conversion component which is capable of converting transmitting signals from electric signals into light signals can be constructed. On the surface of the electric wiring layer 28, there is disposed a photodiode 31 for transmitting a light beam having a wavelength of 1.55 $\mu$m. By using this optical semiconductor element, a transmission component which is capable of converting input signals from light signals into electric signals can be constructed. The optical waveguide layer 34 is provided with an optical waveguide 33 consisting of a Y-branched circuit which is provided, at an upper branched portion thereof, with a wavelength-selecting filter 32.

The bidirectional light transmitting module constructed in this manner was manufactured by the following procedure. Namely, first of all, the electric wiring layer 28 was formed on the surface of the substrate 27. Then, by using a solution of the heterocyclic polyimide precursor which was prepared in the same manner as described in Example 23 and by the same procedure as that described in Example 23, the optical waveguide layer 34 was formed on the surface of the electric wiring layer 28. Further, by lithography, etc., specific regions of the optical waveguide layer 34, which are assigned to mount optical semiconductor elements such as the laser diode 29 for transmitting a light beam and the photodiode 30 for monitoring the output of light were peeled away, and then, by dicing, rectangular grooves were formed on the regions for forming a coupling portion between the optical semiconductor elements and the optical waveguide layer and on the regions where the wavelength filter 32 was to be mounted.

Thereafter, an Au/Sn solder layer was formed on the regions of the electric wiring layer, and the photodiode 31 for transmitting a light beam was mounted and electrically connected with the wiring layer through the fusion of the solder layer. Subsequently, the wavelength filter 32 was fixed to a rectangular groove located at a center of the optical waveguide layer, and the optical fiber was secured to the V groove by using an adhesive. As a result of these processes, it was possible to manufacture, at a low cost, the bidirectional light transmitting module which was excellent in light transmitting property and in heat resistance.

The bidirectional light transmitting module was confirmed to exhibit a cross talk of as small as −35 dB.

EXAMPLE 31

FIG. 10 shows a cross-sectional view illustrating the structure of a photoelectric composite wiring board manufactured in this example. In the photoelectric composite wiring board shown in FIG. 10, semiconductor chips 37 are attached through a microbump 38 to the underside-surface of a supporting substrate 36. This microbump=38 functions as an output port for the electrodes of the semiconductor chips 37.

The supporting substrate 36 provided on the top surface thereof with an electric wiring 43 which is electrically connected with the aforementioned semiconductor chips 37 through an electric wiring which is formed in such a manner as to pierce through the substrate. Through the electric connection with an electric wiring 43, a light emitting element 39 such as a semiconductor laser and LED, as well as a light receiving element 40 such as a photodiode are disposed, these elements 39 and 40 being insulated by the provision of an insulating layer 41. Further, in such a manner as to electrically connect with the light emitting element 39 and with the light receiving element 40, an optical waveguide layer 42 having inclined faces on the opposite sidewalls thereof is formed on the surface of the insulating layer 41. This optical waveguide layer 42 was manufactured in the same manner as that described in Example 23 using a solution of the heterocyclic polyimide precursor which was prepared by the same way as described in Example 23.

The photoelectric composite wiring board constructed in this manner is designed such that electric power is fed thereto from a power source (not shown) through the electric wiring 43, thereby enabling the semiconductor chip 37, the light emitting element 39 and the light receiving element 40 to be actuated. When an electric signal is output to the light emitting element 39 from the semiconductor chip 37, the light emitting element 39 is actuated so as to convert electric signals into light signals, thereby enabling the converted light signals to output. The light signals enters into the inclined face formed on one of the sidewalls, and to reflect approximately perpendicularly, thereby enabling the light signals to be introduced into the optical waveguide layer.

The light signal introduced in this manner into the optical waveguide layer is permitted to transmit as it is, and then, to reflect at the inclined face constituting the opposite sidewall, thus enabling the light signals to be introduced into the light receiving element 40. At this light receiving element 40, the light signals are converted into electric signals, which are then output to the semiconductor chip 37. In this manner, it is possible, by the optical waveguide layer 42, to enable the light signals to transmit at a high speed between two semiconductor chips 37.

EXAMPLE 32

FIG. 11 is a perspective view illustrating a light modulator manufactured in this example. In the light modulator shown in FIG. 11, a lower electrode 46, a lower clad layer 47, a core pattern layer 48 and an upper clad layer 49 are successively laminated on a silicon substrate 45. Further, upper electrodes 50 are formed on the top surface of the light modulator.

This light modulator was manufactured according to the following procedure. Namely, first of all, a Cr layer having a thickness of 500 angstroms and a Au layer having a thickness of 2000 angstroms were successively laminated on the silicon substrate 45 by vacuum vapor deposition method, thereby forming a lower electrode 46. By using a solution of the heterocyclic polyimide precursor which was prepared in the same manner as described in Example 23 and by the same way as that described in Example 23, the lower clad layer 47 having a thickness of 5 μm and a core layer were successively formed on the surface of the lower electrode 46. On the occasion of forming the core layer, the polyimide varnish employed was formed of a solution which was prepared in the same manner as in the case of Example 19 and contained 5% by weight, based on the solid matter, of DR1 (Disperse Red 1) as a non-linear optical molecule and 10% by weight, based on the solid matter, of 4-hydroxy pyridine as a heat cure promoter. This polyimide varnish was spin-coated on the surface of the lower clad layer 47 and, after the solvent included therein was removed, the coated layer was prebaked to obtain a core layer.

On the surface of the resultant laminate, an upper Au electrode was deposited to a thickness of 2000 angstroms, and then, a DC voltage was applied between the upper electrode and the lower electrode in a nitrogen atmosphere, thereby performing the poling treatment of the laminate. Upon finishing the poling, the upper Au electrode was removed and a resist film was deposited thereon. By using a mask of Mach-Zehnder type waveguide pattern, the resist film was subjected to exposure/development treatments to form a dry etching mask pattern.

By reactive ion etching using oxygen gas, the core layer that had been subjected to the poling treatment was worked to obtain a core pattern layer 48. After the mask pattern was removed, the upper clad layer 49 was formed by using the same material as that of the lower clad layer.

Further, the upper electrode 50 was formed on the core waveguide to obtain the light modulator of this example.

Laser beam having a wavelength of 1.3 μm was introduced from the waveguide input port into the light modulator to evaluate the transmission loss, electro-optic constant and π shift voltage of the modulator. As a result, the transmission loss was 0.5 dB/cm, the electro-optic constant was 10 μm/V, and the π shift voltage was 15V. Further, high-frequency signals were applied to the electrodes to observe the intensity of light to be output to the output port by using a spectral analyzer, thus confirming a modulation at 100 MHz.

As explained above, it is possible, according to one aspect of the present invention, to provide a polyimide optical material which is provided with sufficient heat resistance and solvent resistance demanded for the manufacture of an optoelectronic integrated circuit and which can be employed as an organic polymer optical material exhibiting an extremely low light transmission loss in the near infrared zone, in particular, throughout the entire wavelength zone for optical transmission (1.0 μm to 1.7 μm). It is also possible to provide a solution of a polyimide precursor, which is useful for synthesizing the aforementioned polyimide optical material. Further, according to another aspect of the present invention, it is possible to provide an optical waveguide element which can be easily manufactured and is excellent in heat resistance and minimal in light transmission loss.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polyimide precursor solution comprising a heterocyclic polyamic acid having an unit represented by the following general formula (4), (5) or (6):

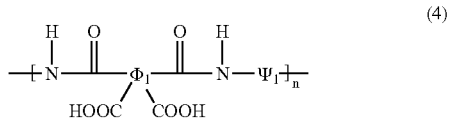

(4)

(wherein $\Phi_1$s may be the same or different and are individually a quadrivalent organic group, the $\Phi_1$s including at least 0.2 molar equivalent of a quadrivalent hetrocyclic group selected from the following Group (a); $\Psi_1$s may be the same or different and are individually a bivalent organic group; and n is a positive integer)

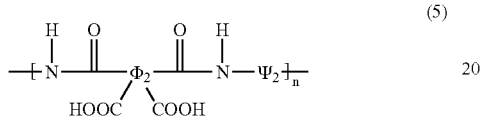

(5)

(wherein $\Phi_2$s may be the same or different and are individually a quadrivalent organic group; $\Psi_2$s may be the same or different and are individually a bivalent organic group, the $\Psi_2$s including at least 0.2 molar equivalent of a bivalent hetrocyclic group selected from the following Group (b); and n is a positive integer)

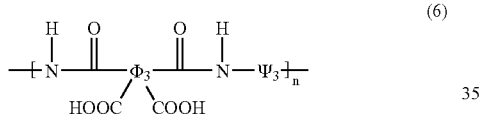

(6)

(wherein $\Phi_3$s may be the same or different and are individually a quadrivalent organic group, the $\Phi_3$s including at least 0.1 molar equivalent of a quadrivalent hetrocyclic group selected from the following Group (a); $\Psi_3$s may be the same or different and are individually a bivalent organic group, the $\Psi_3$s including at least 0.1 molar equivalent of a bivalent hetrocyclic group selected from the following Group (b); and n is a positive integer)

Group (a):

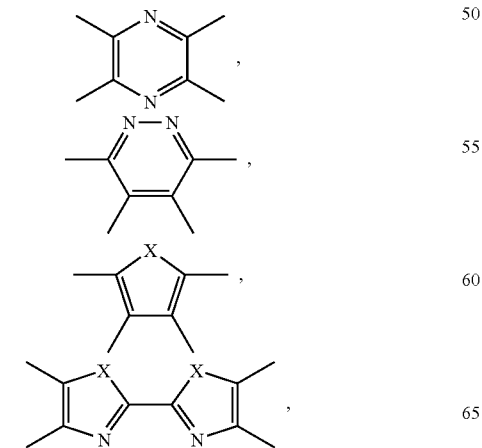

-continued

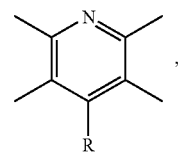

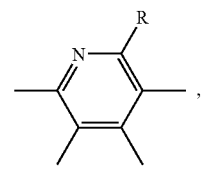

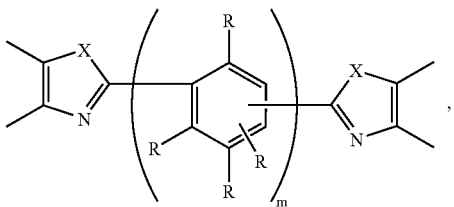

Group (b):

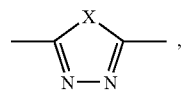

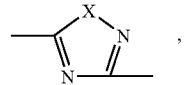

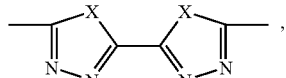

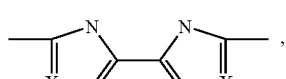

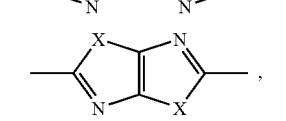

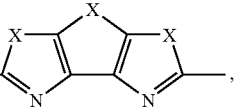

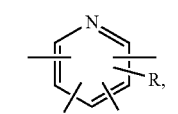

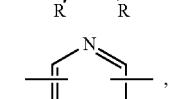

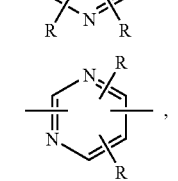

-continued

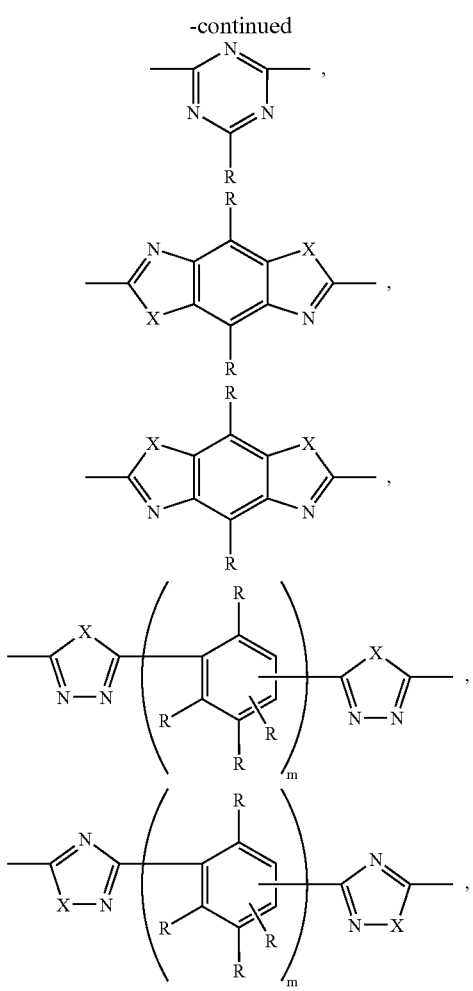

(wherein in the above formulas, X may be the same or different and are individually >O group, >S group or >N—R$^f$ group (R$^f$ group is perfluoroalkyl group); R may be the same or different and are individually fluoro group, chloro group, bromo group, iodo group, perfluoroalkyl group, perfluoroalkoxy group, perfluoroalkylthio group, nitro group or cyano group; m is an integer of 1 to 4).

2. The polyimide precursor solution according to claim 1, wherein the polyamic acid is synthesized by polymerizing a tetracarboxylic dianhydride and a diamine compound in an inert gas atmosphere and in an organic polar solvent without the presence of water.

3. The polyimide precursor solution according to claim 2, wherein the tetracarboxylic dianhydride is a heterocyclic tetracarboxylic dianhydride is selected from the group consisting of a substituted, an unsubstituted heterocyclic tetracarboxylic dianhydride, and a combination thereof, wherein all of hydrogen radicals in the heterocyclic tetracarboxylic dianhydride are substituted by a substituent group selected from the group consisting of a halogen group, a perfluoroalkyl group, a perfluoroalkoxy group, a nitro group, and a cyano group.

4. The polyimide precursor solution according to claim 3, wherein the unsubstituted heterocyclic tetracarboxylic dianhydride is selected from the group consisting of pyrazine tetracarboxylic dianhydride, pyridazine tetracarboxylic dianhydride, furan tetracarboxylic dianhydride, thiophene tetracarboxylic dianhydride, bioxazole tetracarboxylic dianhydride and bithiazole tetracarboxylic dianhydride.

5. The polyimide precursor solution according to claim 3, wherein the substituted heterocyclic tetracarboxylic dianhydride is selected from the group consisting of pyridine tetracarboxylic dianhydride, phenylene bis(oxazole dicarboxylic)dianhydride, phenylene bis(thiazole dicarboxylic) dianhydride, bifuran tetracarboxylic dianhydride, and bithiophene tetracarboxylic dianhydride.

6. The polyimide precursor solution according to claim 2, wherein the diamine compound is a heterocyclic diamine compound is selected from the group consisting of a substituted, a unsubstituted heterocyclic diamine, and a combination thereof, wherein all of hydrogen radicals other than amino group in the heterocyclic diamine are substituted by a substituent group selected from the group consisting of a halogen group, a perfluoroalkyl group, a perfluoroalkoxy group, a nitro group, and a cyano group.

7. The polyimide precursor solution according to claim 6, wherein the unsubstituted heterocyclic diamine is selected from the group consisting of diaminooxadiazole, diaminothiadiazole, diaminobioxadiazole, diaminobithiadiazole, diaminooxazooxazole, diaminooxazothiazole, diaminothiazolothiazole, diaminothiazolothienothiazole, and diaminothiazolopyrazinothiazole.

8. The polyimide precursor solution according to claim 6, wherein the substituted heterocyclic diamine is selected from the group consisting of diaminopyrrole, diaminopyridine, diaminopyridazine, diaminopyrimidine, diaminopyrazine, diaminotriazine, phenylene bis(aminooxadiazole), phenylene bis(aminothiadiazole), phenylene bis(aminopyrazole), diaminobenzobisoxazole, diaminobenzobisthiazole, diaminofuran, diaminothiophene, diaminobioxazole, and diaminobithiazole.

9. The polyimide precursor solution according to claim 2, wherein a temperature of the polymerization reaction is in the range of −20 to 100° C.

10. The polyimide precursor solution according to claim 2, wherein a temperature of the polymerization reaction is in the range of −5 to 30° C.

11. The polyimide precursor solution according to claim 1, wherein the organic polar solvent is selected from the group consisting of N,N-dimethylformamide, N,N-dimethylacetamide, N,N-diethylacetamide, N,N-dimethoxyacetamide, N-methyl-2-pyrrolidone, N-acetyl-2-pyrrolidone, N-benzyl-2-pyrrolidone, 1,3-dimethyl-2-imidazolidinone, hexamethylphosphortriamide, N-methyl-ε-caprolactam, N-acetyl-ε-caprolactam, 1,2-dimethoxyethane, 1,2-diethoxyethane, bis(2-methoxyethyl)ether, bis(2-ethoxyethyl)ether, 1,2-bis(2-methoxyethoxy)ethane, bis[2-(2-methoxyethoxy)ethyl]ether, 1-acetoxy-2-methoxyethane, 1-acetoxy-2-ethoxyethane, (2-acetoxyethyl)(2-methoxyethyl)ether, (2-acetoxyethyl)(2-ethoxyethyl)ether, methyl 3-methoxypropionate, tetrahydrofuran, 1,3-dioxane, 1,3-dioxolane, 1,4-dioxane, pyrroline, pyridine, picoline, dimethylsulfoxide, sulfolane, γ-butyrolactone, propylene carbonate, phenol, cresol, acetone, methylethyl ketone, methylisobutyl ketone, cyclohexanone, acetonylacetone, and combinations thereof.

* * * * *